(12) United States Patent
Tsuruyama et al.

(10) Patent No.: US 11,069,076 B2
(45) Date of Patent: Jul. 20, 2021

(54) IMAGE PROCESSING DEVICE AND IMAGE CAPTURE APPARATUS

(71) Applicant: KABUSHIKI KAISHA TOSHIBA, Tokyo (JP)

(72) Inventors: Tomoya Tsuruyama, Kanagawa (JP); Nao Mishima, Tokyo (JP); Tatsuo Kozakaya, Kanagawa (JP); Akihisa Moriya, Tokyo (JP); Jun Yamaguchi, Kanagawa (JP); Takayuki Sasaki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 134 days.

(21) Appl. No.: 16/298,039

(22) Filed: Mar. 11, 2019

(65) Prior Publication Data
US 2020/0051261 A1 Feb. 13, 2020

(30) Foreign Application Priority Data
Aug. 7, 2018 (JP) .............................. JP2018-148552

(51) Int. Cl.
*G06T 7/50* (2017.01)
*G01B 11/02* (2006.01)

(52) U.S. Cl.
CPC ............. *G06T 7/50* (2017.01); *G01B 11/026* (2013.01)

(58) Field of Classification Search
CPC ............ G06T 7/50; G06T 2207/10004; G01B 11/026; G06K 9/00; G06K 9/00818
USPC ....................................................... 382/106
See application file for complete search history.

(56) References Cited

U.S. PATENT DOCUMENTS

| 10,635,844 | B1* | 4/2020 | Roose ........................ G06T 7/75 |
| 2010/0172542 | A1* | 7/2010 | Stein ....................... G06K 9/209 |
| | | | 382/103 |
| 2012/0233841 | A1* | 9/2012 | Stein ....................... G03B 17/02 |
| | | | 29/428 |
| 2013/0194419 | A1* | 8/2013 | Bhowmick ............. G06T 7/277 |
| | | | 348/142 |
| 2014/0177960 | A1 | 6/2014 | Park et al. |
| 2015/0161773 | A1 | 6/2015 | Takahashi et al. |
| 2017/0054910 | A1 | 2/2017 | Moriuchi et al. |
| 2017/0234976 | A1* | 8/2017 | Grauer .................... G01S 17/89 |
| | | | 356/5.04 |
| 2018/0137638 | A1 | 5/2018 | Taguchi et al. |
| 2019/0023266 | A1* | 1/2019 | Kouri ..................... G01C 21/32 |

FOREIGN PATENT DOCUMENTS

| JP | 2013-236249 A | 11/2013 |
| JP | 2017-40642 A | 2/2017 |
| JP | 2018-78517 A | 5/2018 |

* cited by examiner

*Primary Examiner* — Ali Bayat
(74) *Attorney, Agent, or Firm* — Finnegan, Henderson, Farabow, Garrett & Dunner, L.L.P.

(57) ABSTRACT

According to one embodiment, an image processing device includes a hardware processor implemented by one or more processors. The hardware processor is configured to acquire an image captured by a monocular camera. The hardware processor is configured to estimate a distance to an object based on the acquired image. The hardware processor is configured to calculate the distance to the object by considering an atmosphere failure influencing the acquired image and executing a statistical process on the estimated distance.

10 Claims, 17 Drawing Sheets

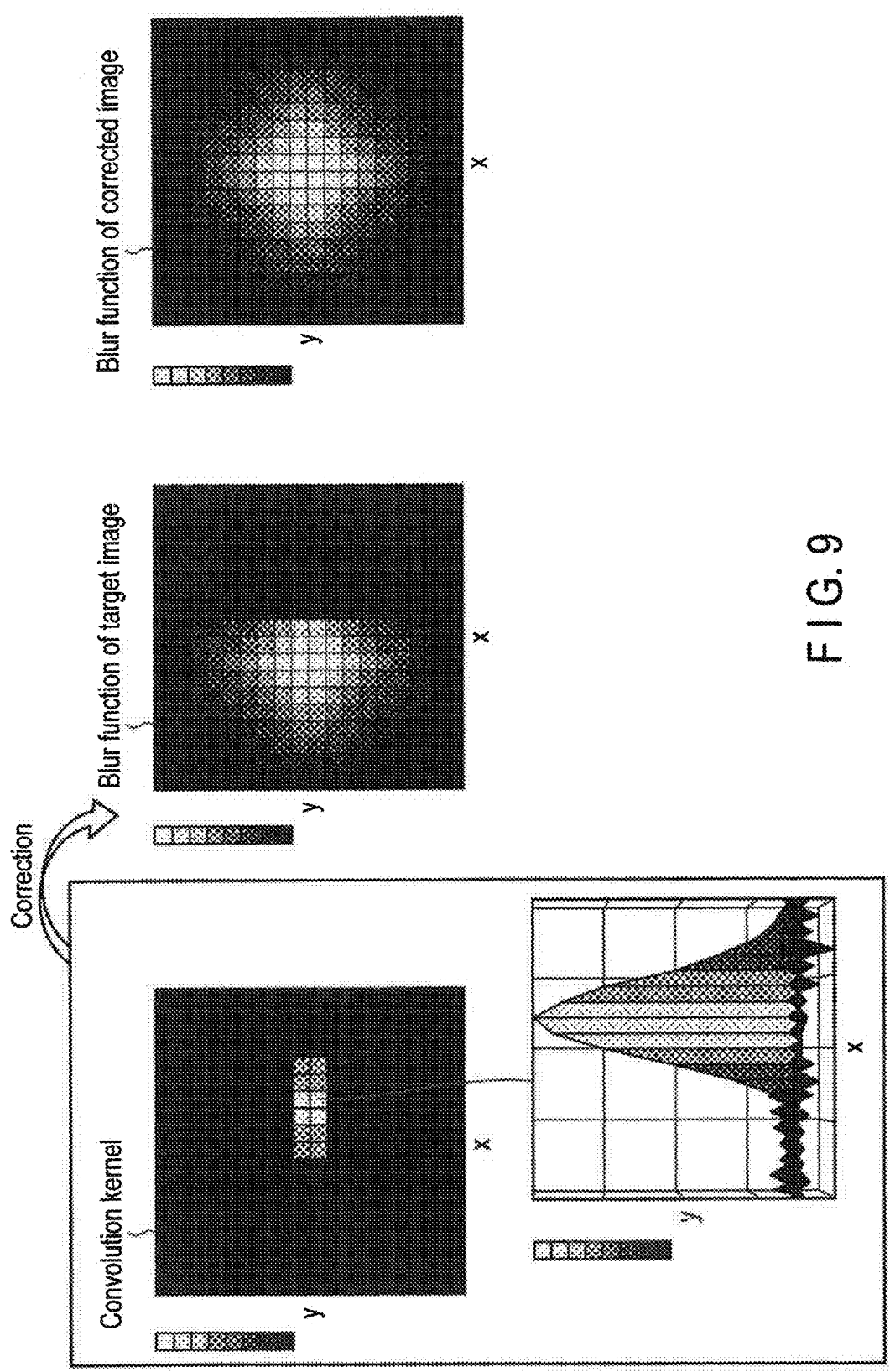
F I G. 9

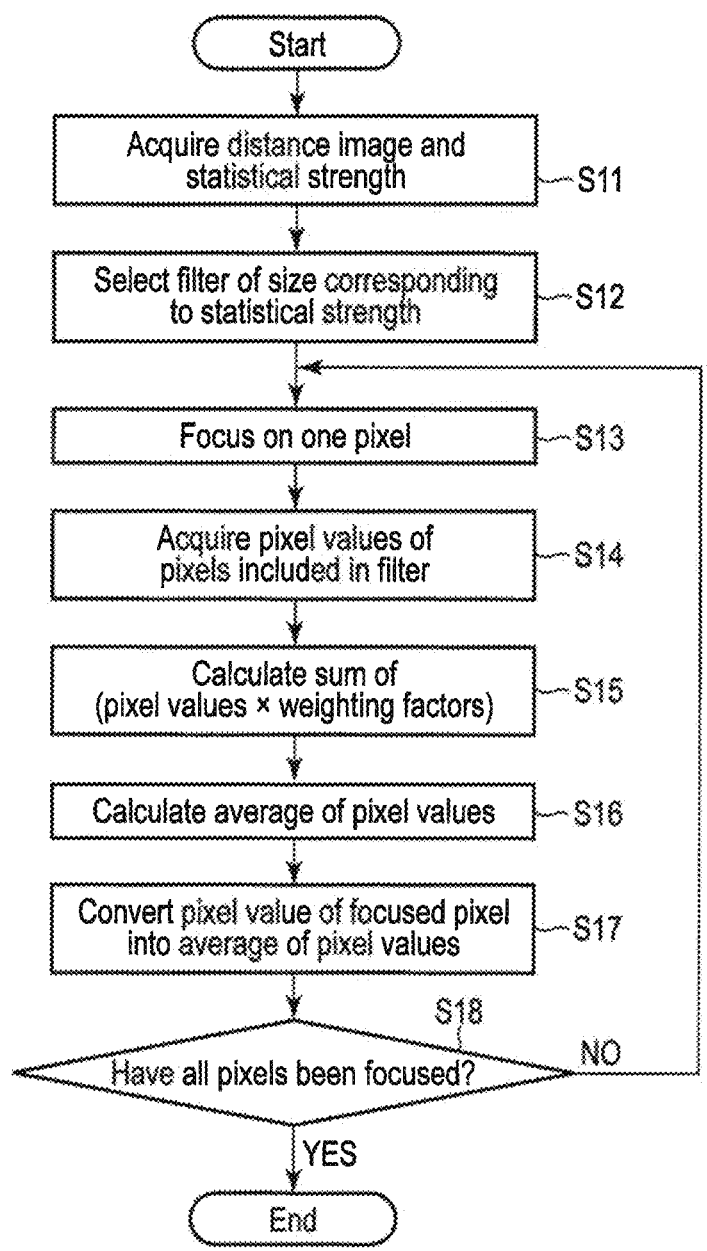
F I G. 12

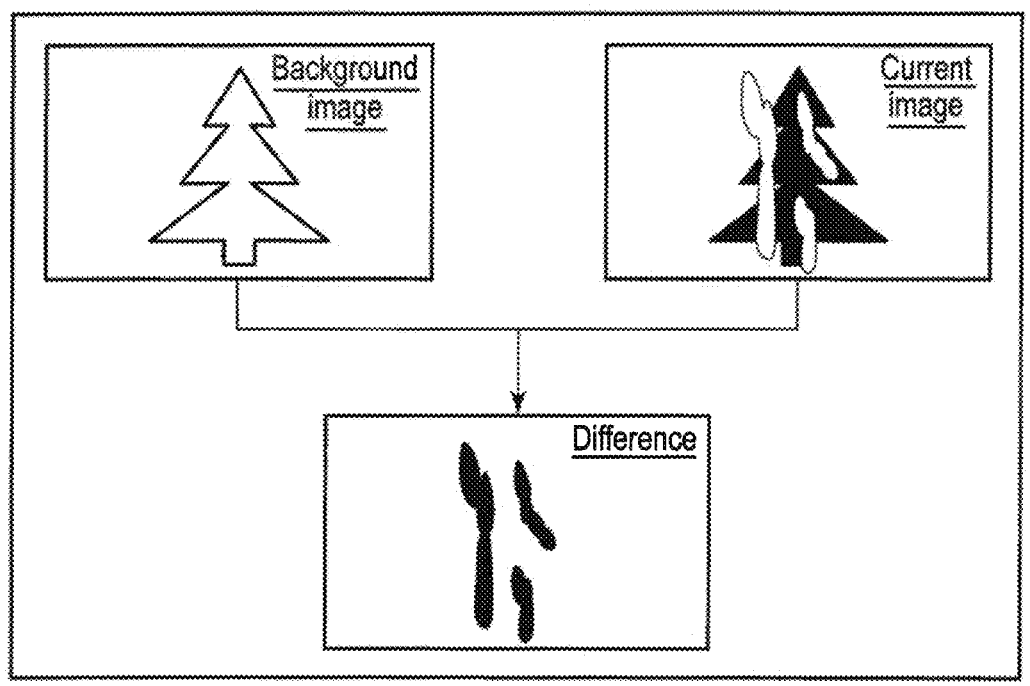
F I G. 17
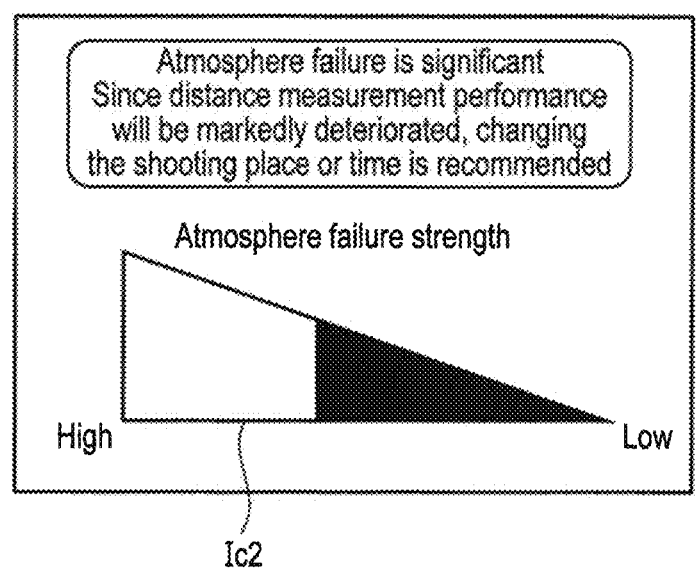
F I G. 18

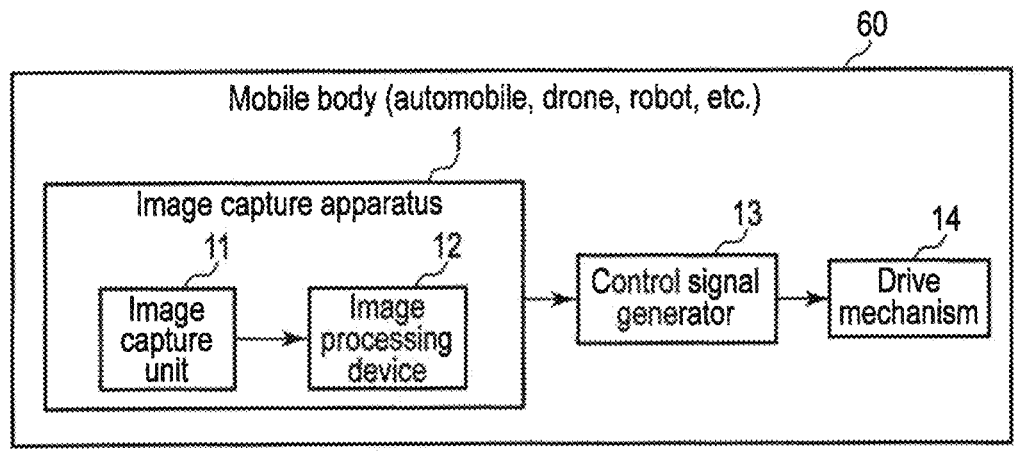
F I G. 21
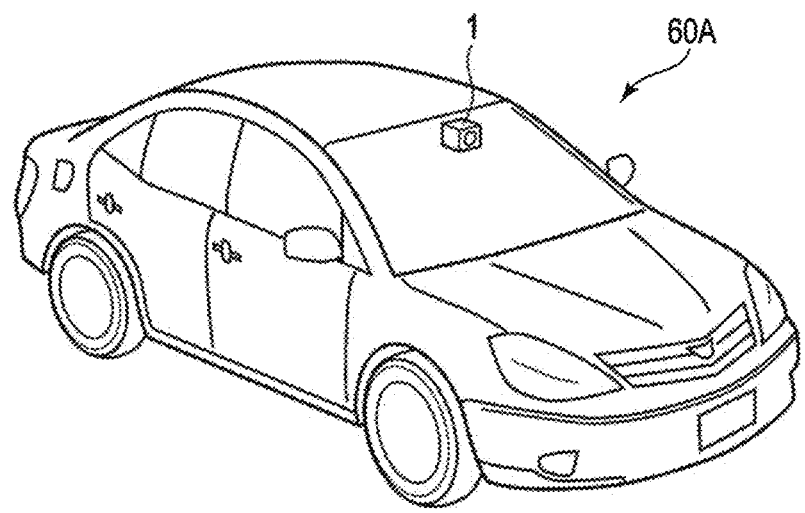
F I G. 22

IMAGE PROCESSING DEVICE AND IMAGE CAPTURE APPARATUS

CROSS-REFERENCE TO RELATED APPLICATIONS

This application is based upon and claims the benefit of priority from Japanese Patent Application No. 2018-148552, filed Aug. 7, 2018, the entire contents of which are incorporated herein by reference.

FIELD

Embodiments described herein relate generally to an image processing device and an image capture apparatus.

BACKGROUND

A technique for obtaining a distance to an object from images captured by two cameras or a stereo camera (binocular camera) is known. Furthermore, there is a technique recently proposed to obtain a distance to an object from images captured by one camera (monocular camera).

The captured images may be influenced by atmosphere failures such as fog and heat haze. When a distance to a subject is acquired by the use of such images may lead to a reduction in accuracy.

BRIEF DESCRIPTION OF THE DRAWINGS

FIG. 9 illustrates an example of a convolution kernel according to the embodiment.

FIG. 12 is a flowchart of an example for a procedure for a statistical process by a statistical processor according to the embodiment.

FIG. 17 is a diagram for describing a method for calculating the degree of an atmosphere failure according to the embodiment.

FIG. 18 is another diagram illustrating an icon suggested to a user of the image capture apparatus according to the embodiment.

FIG. 21 is a diagram illustrating a configuration example of a mobile body including the image capture apparatus according to the embodiment.

FIG. 22 is a diagram for describing a case in which the image capture apparatus according to the embodiment is applied to an automobile as a mobile body.

DETAILED DESCRIPTION

In general, according to one embodiment, an image processing device includes a hardware processor implemented by one or more processors. The hardware processor is configured to acquire an image captured by a monocular camera. The hardware processor is configured to estimate a distance to an object based on the acquired image. The hardware processor is configured to calculate the distance to the object by considering an atmosphere failure influencing the acquired image and executing a statistical process on the estimated distance.

Embodiments will be described below with reference to the drawings. The disclosure is a mere example and the invention is not limited to by the contents of the embodiments described below. Modifications that can be easily conceived by persons skilled in the art naturally fall within the scope of the disclosure. For clearer descriptions, some of the drawings may illustrate schematically the sizes, shapes, and others of components that are different from actual ones in the embodiments. In the plurality of drawings, corresponding elements may be given the same reference numbers and detailed descriptions thereof may be omitted.

First, a structure of an image capture apparatus according to an embodiment will be described with reference to FIG. 1. The image capture apparatus may also to be referred to as a ranging apparatus. The image capture apparatus 1 captures an image, and estimates a distance (also referred to as a depth) from a position of the image capture apparatus 1 to the object by using the captured images.

The image capture apparatus 1 includes an image capture unit 11 that captures an image and an image processing device 12 that processes the captured image. The image capture apparatus 1 may be realized as an apparatus provided with the image capture unit 11 and the image processing device 12, or may be realized as a system including multiple devices such as an image capture apparatus corresponding to the image capture unit 11 and an image processing apparatus corresponding to the image processing device 12. The image capture unit 11 has a function of obtaining an image of an object and information relating to a distance to the object by one shot. With this function, for example, the image capture unit 11 obtains an image (also referred to as a distance image) in which distance information to the object at the time of capturing is encoded. The image processing device 12 can be realized as, for example, a computer or an embedded system incorporated in various electronic devices.

Figure 1:
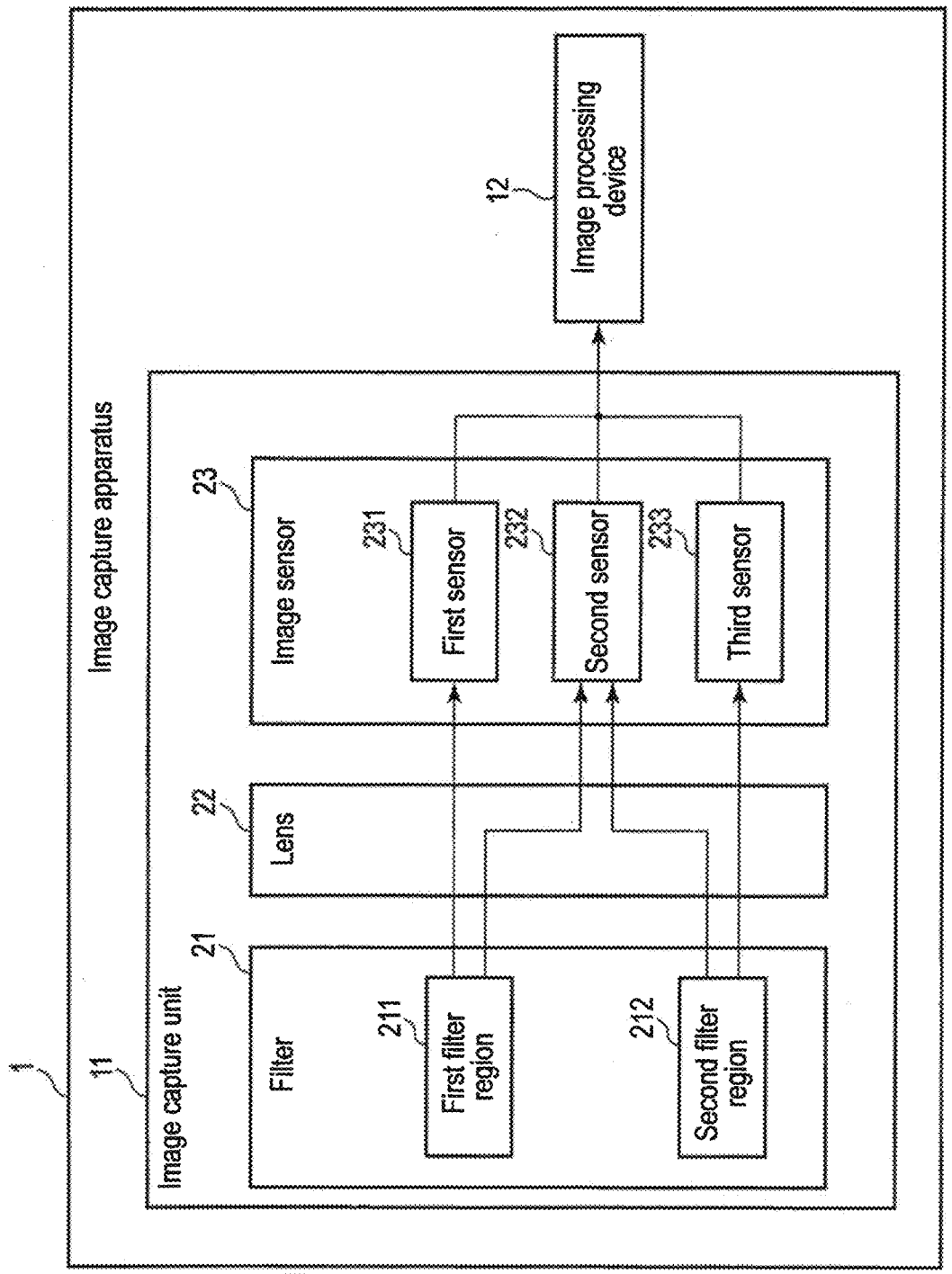
FIG. 1 illustrates a configuration example of an image capture apparatus according to an embodiment.

As illustrated in FIG. 1, the image capture unit 11 includes a monocular camera provided with a filter 21, a lens 22, and an image sensor 23. The filter 21 includes filter areas that transmit light rays having different wavelength bands (color components). The filter 21 includes, for example, filter areas of two colors: a first filter area 211 and a second filter area 212.

The image sensor 23 receives the light rays penetrating the filter 21 and the lens 22, and converts the received light rays into electrical signals (photoelectric conversion). Examples of the image sensor 23 include a charge coupled device (CCD), and a complementary metal oxide semiconductor (CMOS). The image sensor 23 includes at least two kinds of imaging elements and is provided with, for example, a first sensor 231 including imaging elements that receive red (R) light rays, a second sensor 232 including imaging elements that receive green (G) light rays, and a third sensor 233 including imaging elements that receive blue (B) light rays. Each imaging element receives light rays having a corresponding wavelength band, and converts the received light rays into electrical signals. The electrical signals are converted by A/D conversion so as to generate a color image. Hereinafter, color component images (also referred to as wavelength component images) which are images of an R component, a G component, and a B component are also referred to as an R image, a G image, and a B image, respectively. It should be noted that the R, G, and B images can also be generated with the electrical signals for each of the red, green, and blue imaging elements. In other words, the image capture unit 11 can generate at least one of the color images: the R, G, and B images, by one-time capturing (one shot).

Figure 2:
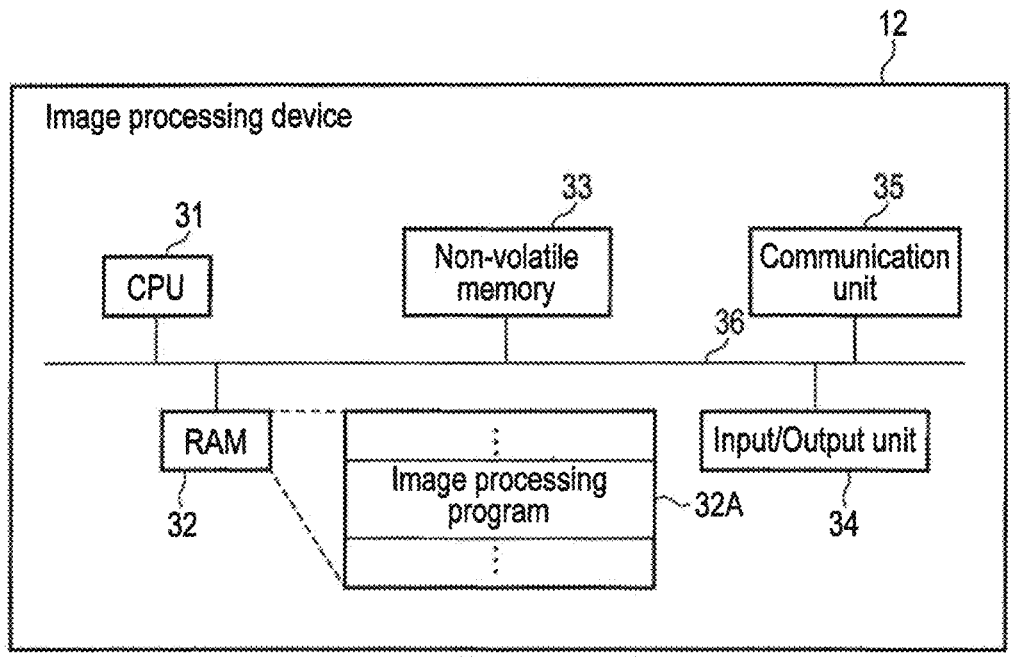
FIG. 2 illustrates a system configuration example of an image processing device according to the embodiment.

As illustrated in FIG. 2, the image processing device 12 includes a CPU 31, a RAM 32, a nonvolatile memory 33, an input/output unit 34 and a communication unit 35. The image processing device 12 also includes a bus 36 that mutually connects the CPU 31, RAM 32, nonvolatile memory 33, an input/output unit 34, and communication unit 35.

The CPU 31 controls operations of various components in the image processing device 12. The CPU 31 may be a single processor or may include multiple processors. The CPU 31 executes various programs loaded from the nonvolatile memory 33 into the RAM 32. These programs include an operating system (OS) and various application programs. The application program includes an image processing program 32A. The image processing program 32A includes instructions for estimating a distance from the image capture apparatus 1 to an object using at least one captured images and calculating the distance from the image capture apparatus 1 to the object by analyzing the estimated distance. The RAM 32 is a storage medium used as a main storage device. The nonvolatile memory 33 is a storage medium used as an auxiliary storage device.

The input/output device 34 is a module which executes input of an image from the imaging unit 11, input of an instruction from a user, and output of a display screen image to the display (not shown). The instruction from the user may be input in accordance with an operation of a keyboard, a pointing device, an operation button, etc., and if the display is a touchscreen display, the instruction from the user may be input in accordance with a touch operation on the touchscreen display.

The communication unit 35 is a device configured to execute wire communication or wireless communication. The communication unit 35 includes a transmitter that transmits a signal and a receiver that receives a signal. The communication unit 35 executes, for example, communication with an external device over a network, and communication with an external device on the periphery. An example of the external device includes the image capture unit 11 (imaging process device). Therefore, the communication unit 35 may receive an image from the image capture unit 11.

Figure 3:
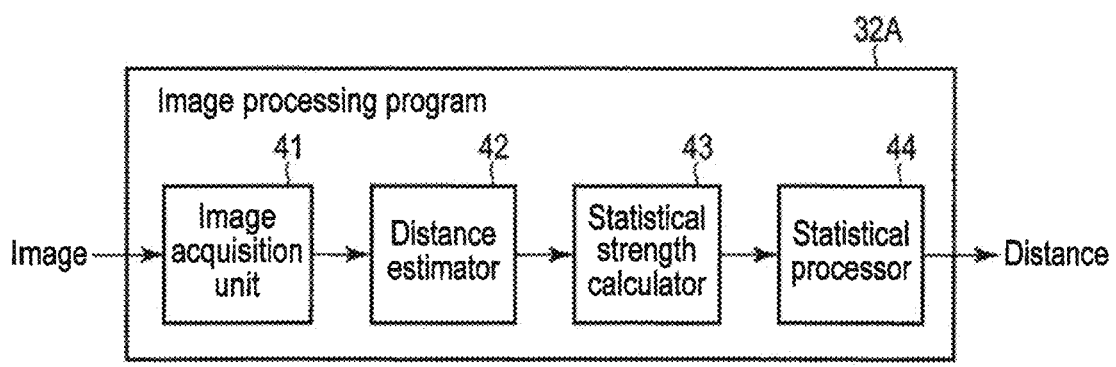
FIG. 3 illustrates a functional configuration example of an image processing program according to the embodiment.

FIG. 3 illustrates an example of a functional configuration of the image processing program 32A executed by the CPU 31 in the image processing device 12. The image processing program 32A includes an image acquisition unit 41, a distance estimator 42, a statistical strength calculator 43, a statistical processor 44, and others. The respective functions of the functional units will be described later and thus detailed descriptions thereof are omitted here.

A configuration example of the filter 21 illustrated in FIG. 1 will be described with reference to FIG. 4. The filter 21 has the filter areas that transmit light rays having different wavelength bands (color components), and two or more filter areas are point-asymmetric with respect to an optical center 213 of an image capture apparatus 1. The filter 21 includes, for example, filter areas of two colors: the first filter area 211 and the second filter area 212. The center of the filter 21 corresponds to the optical center 213 of the image capture apparatus (lens 22). Each of the first filter area 211 and the second filter area 212 has a shape point-asymmetric with respect to the optical center 213. For example, the two filter areas 211 and 212 do not overlap, and the two filter areas 211 and 212 constitute the entire area of the filter 21. In the example illustrated in FIG. 4, each of the first filter area 211 and the second filter area 212 has a semicircular shape formed by dividing the circular filter 21 by a line through the optical center 213.

For example, the first filter area 211 is a yellow (Y) filter area, and the second filter area 212 is a cyan (C) filter area. It should be noted that the first filter area 211 may be a magenta (M) filter area, and the second filter area 212 may be a yellow (Y) filter area. Furthermore, the first filter area 211 may be a cyan (C) filter area, and the second filter area 212 may be a magenta (M) filter area.

Those color filters transmit different wavelength bands. A part of a wavelength band of light rays that penetrates one filter area may have, for example, an overlap with a part of a wavelength band of light rays that penetrates another color filter area. A wavelength band of light rays that penetrates one color filter area may include, for example, a wavelength band of light rays that penetrates another color filter area.

It should be noted that each of the first filter area 211 and the second filter area 212 may be a filter that changes transmittance of any wavelength bands, or a polarized filter that allows light rays polarized in any directions to pass therethrough. Alternatively, each filter area may be a microlens that changes light-condensing power of any wavelength bands. The filter that changes transmittance of any wavelength bands may be, for example, a primary color filter (RGB), a complementary color filter (CMY), a color correction filter (CC-RGB/CMY), an infrared/ultraviolet cut filter, an ND filter, or a masking shield. In a case where the first filter area 211 and the second filter area 212 are microlenses, the lens 22 brings about biasing distribution of condensed light rays, which changes blur shapes.

For sake of simplicity, hereinafter mainly illustrated is a case where the first filter area 211 is a yellow (Y) filter area and the second filter area 212 is a cyan (C) filter area in the filter 21 illustrated in FIG. 4.

Figure 4:
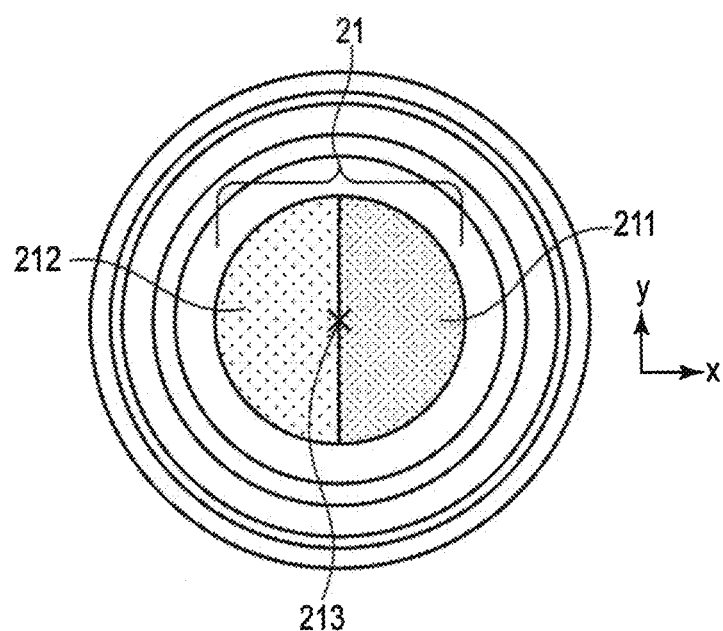
FIG. 4 illustrates a configuration example of a filter according to the embodiment.

For example, the filter 21 illustrated in FIG. 4 being provided to an aperture of the camera configures a color aperture having a structure in which the aperture is divided into halves by two colors. Based on light rays that penetrate the color aperture, the image sensor 23 generates an image. The lens 22 may be disposed between the filter 21 and the image sensor 23 on an optical path of the light rays incident upon the image sensor 23. The filter 21 may be disposed between the lens 22 and the image sensor 23 on the optical path of the light rays incident upon the image sensor 23. In a case where lenses 22 are provided, the filter 21 may be disposed between two lenses 22.

Light rays having a wavelength band corresponding to the second sensor 232 penetrate both the first filter area 211 of yellow color and the second filter area 212 of cyan color. Light rays having a wavelength band corresponding to the first sensor 231 penetrate the first filter area 211 of yellow color and do not penetrate the second filter area 212 of cyan color. Light rays having a wavelength band corresponding to the third sensor 233 penetrate the second filter area 212 of cyan color and do not penetrate the first filter area 211 of yellow color.

The fact that light rays having a certain wavelength band penetrate a filter or a filter area represents that the filter or the filter area transmits the light rays having the wavelength band with high transmittance, and the fact represents that attenuation of the light rays having the wavelength band due to the filter or the filter area (a decrease in light intensity) is extremely small. Furthermore, the fact that light rays having a certain wavelength band do not penetrate a filter or a filter area represents that the light rays are shielded by the filter or the filter area: for example, the filter or the filter area transmits the light rays having the wavelength band with low transmittance, and the fact represents that attenuation of the light rays having the wavelength band due to the filter or the filter area is extremely large. For example, a filter or a filter area absorbs light rays having a certain wavelength band so as to attenuate the light rays.

Figure 5:
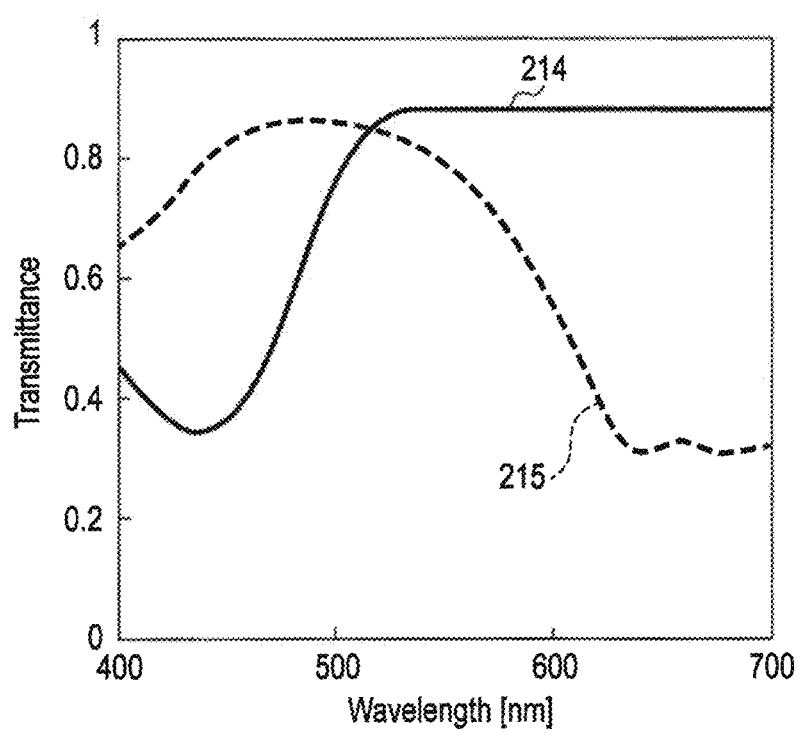
FIG. 5 illustrates an example of transmittance characteristics of the filter according to the embodiment.

FIG. 5 illustrates exemplary transmittance characteristics of the first filter area 211 and the second filter area 212. Although transmittance with respect to light rays having a wavelength band longer than 700 nm in wavelength bands of visible light is not illustrated, it should be noted that the transmittance is close to transmittance with respect to a wavelength band of 700 nm. In a transmittance characteristic 214 of the first filter area 211 of yellow color illustrated in FIG. 5, light rays having wavelength bands from about 620 nm to 750 nm corresponding to the R image and light rays having wavelength bands from about 495 nm to 570 nm corresponding to the G image are transmitted with high transmittance, and light rays having wavelength bands from about 450 nm to 495 nm corresponding to the B image are hardly transmitted. In a transmittance characteristic 215 of the second filter area 212 of cyan color, the light rays having the wavelength bands corresponding to the B image and the light rays having the wavelength bands corresponding to the G image are transmitted with high transmittance, and the light rays having the wavelength bands corresponding to the R image are hardly transmitted.

Therefore, the light rays having the wavelength bands corresponding to the R image (the first sensor 231) penetrate the first filter area 211 of yellow color, and the light rays having the wavelength bands corresponding to the B image (the third sensor 233) penetrate the second filter area 212 of cyan color. The light rays having the wavelength bands corresponding to the G image (the second sensor 232) penetrate the first filter area 211 and the second filter area 212.

These R and B images and blur shapes on the images change in accordance with a distance d to an object, more specifically, in accordance with a difference between the distance d and a focusing distance df. The focusing distance df is a distance from an image-capturing position to a focused position where an image is not blurred (that is, a position in focus). The filter areas 211 and 212 have a shape point-asymmetric with respect to the optical center 213 so that the blur shapes on the R and B images differ and slant depending on situations whether the object is on the near side or on the deep side from the focusing distance df. Directions of the slant in the blurs on the R and B images reverse depending on the situations whether the object is on the near side or the deep side from the focusing distance df as seen from the image-capturing position.

Figure 6:
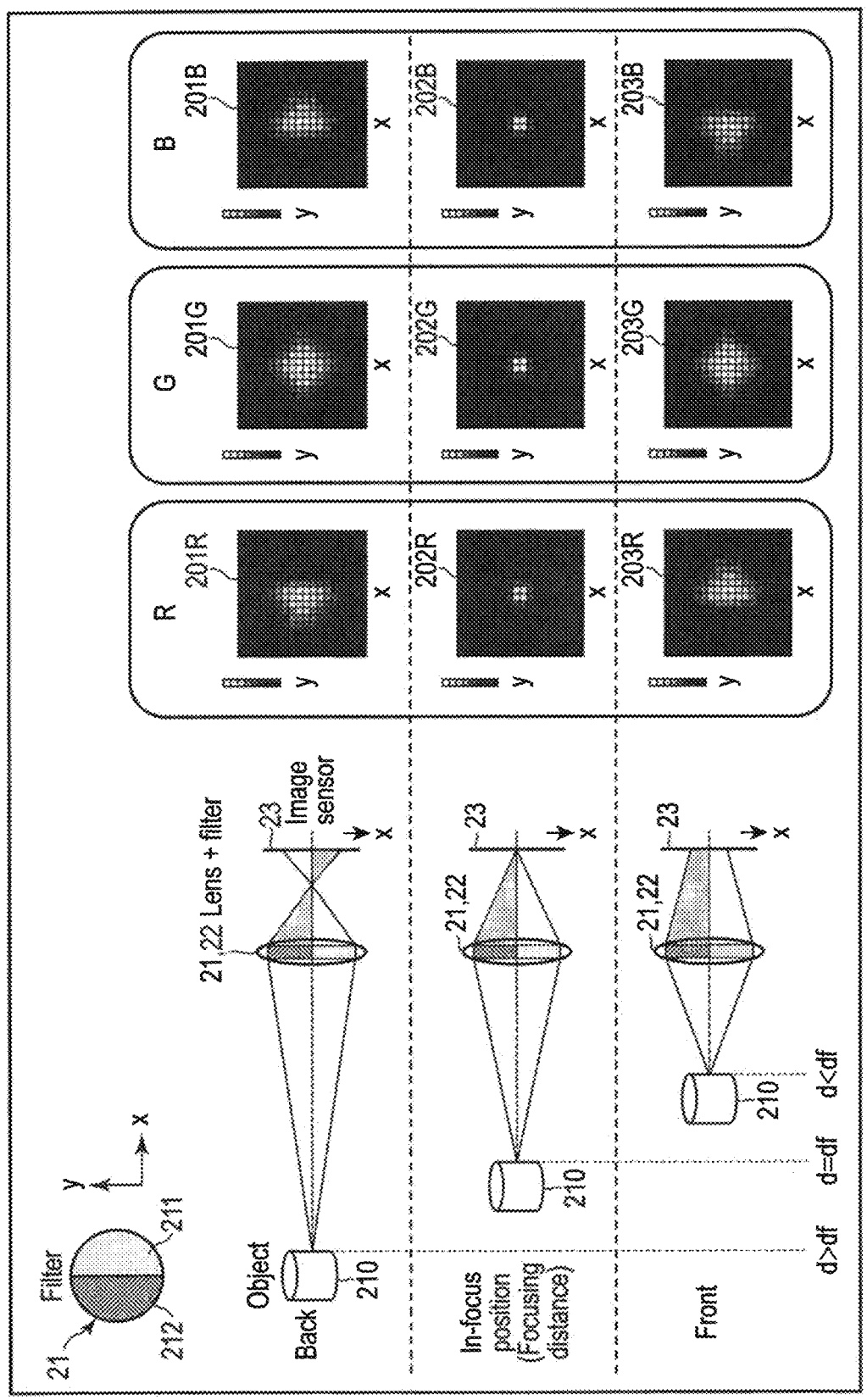
FIG. 6 is a diagram for describing changes in light ray at color apertures with a filter and the blur shapes according to the embodiment.

With reference to FIG. 6, hereinafter described are changes in light rays and blur shapes due to the color aperture provided with the filter 21.

In a case where an object 210 is on the deep side from the focusing distance df (d>df), images captured by the image sensor 23 are blurred. Blur functions (point spread functions: PSF) indicating blur shapes on the images differ between the R, G, and B images. For example, a blur function 201R of the R image indicates a blur shape slanted to the left, a blur function 201G of the G image indicates a balanced blur shape, and a blur function 201B of the B image indicates a blur shape slanted to the right.

When the object 210 is at the focusing distance df (d=df), images captured by the image sensor 23 are hardly blurred. Blur functions indicating blur shapes on the images are substantially similar between the R, G, and B images. In other words, a blur function 202R of the R image, a blur function 202G of the G image, and a blur function 202B of the B image indicate balanced blur shapes.

When the object 210 is on the near side from the focusing distance df (d<df), images captured by the image sensor 23 are blurred. Blur functions indicating blur shapes on the images differ between the R, G, and B images. In other words, a blur function 203R of the R image indicates a blur shape slanted to the right, a blur function 203G of the G image indicates a balanced blur shape, and a blur function 203B of the B image indicates a blur shape slanted to the left.

In this manner, when the object 210 is on the near side or on the deep side from the focusing distance df, the blur function 201R and the blur function 203R of the R image based on the light rays penetrating the first filter area 211 of yellow color are asymmetric, and the blur function 201B and the blur function 203B of the B image based on the light rays penetrating the second filter area 212 of cyan color are also asymmetric. The blur function 201R and the blur function 203R of the R image differ from the blur function 201B and the blur function 203B of the B image, respectively.

The image processing device 12 of the image capture apparatus 1 calculates the distance to an object by using these characteristics.

The image acquisition unit 41 acquires the G image, the blur function of which shows the balanced blur shape, as a reference image. Further, the image acquisition unit 41 acquires one or both of the R image and the B image, the blur functions of which show a one-sided blur shapes, as a target image. The target image and the reference image are images captured by one image capture apparatus at the same point in time.

The distance estimator 42 estimates the distance to an object by acquiring a convolution kernel which increases, when added to the target image, correlation with the reference image, from a plurality of convolution kernels. Further, the distance estimator 42 generates the distance map (distance image) from the calculated distance. The convolution kernels are functions which respectively add different blurs to the target image. Here, the distance estimate processing by the distance estimator 42 will be described in detail.

The distance estimator 42 generates a correction image where a correction is made to the blur shape of the target image by adding a different blur to the target image based on the acquired target image and reference image. Here, the distance estimator 42 uses a plurality of convolution kernels which are prepared based on the assumption that the object is located at predetermined distances, generates a correction image where a correction is made to the blur shape of the target image, acquires a distance which increases the correlation between the correction image and the reference image, and calculates the distance to the object.

Figure 7:
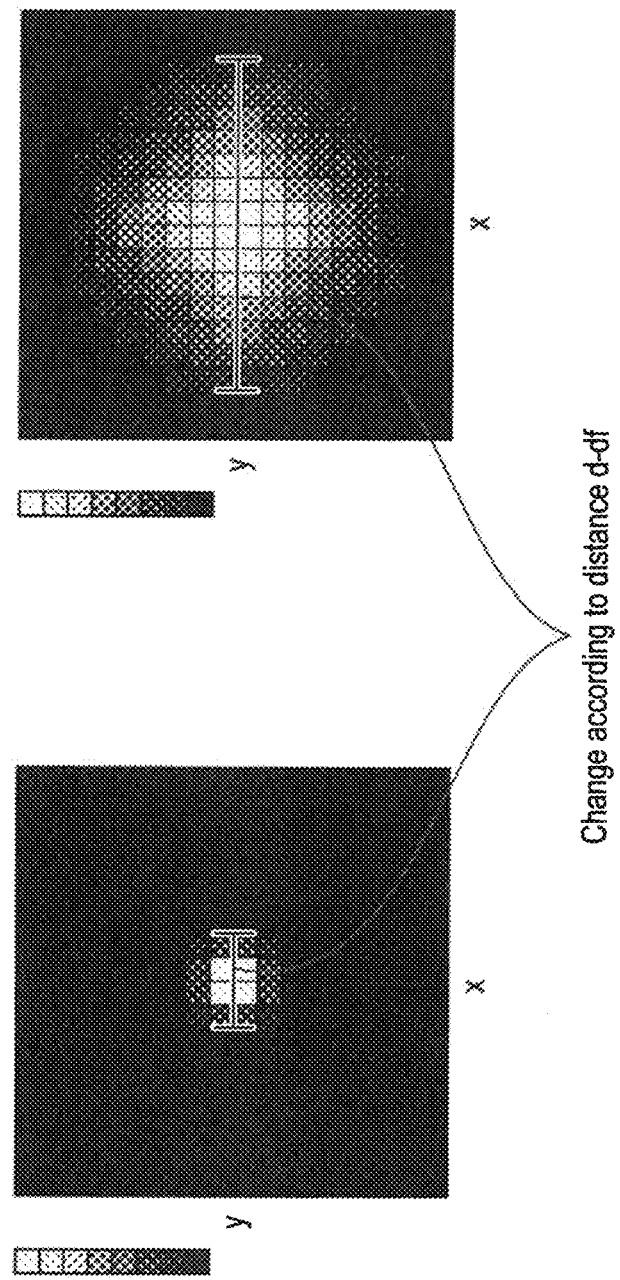
FIG. 7 illustrates an example of a blur function of a reference image according to the embodiment.

The blur function of the captured image is determined by the aperture shape of the image capture apparatus 1 and the distance between the position of the object and the point of focus. FIG. 7 is a diagram showing an example of the blur function of the reference image. As shown in FIG. 7, since the shape of the aperture through which light of the wavelength band corresponding to the second sensor 232 passes is a circle, that is, a point-symmetrical shape, the blur shape shown by the blur function does not vary between the front side and back side of the point of focus, but the width of the blur varies depending on the distance between the position of the object and the point of focus. The blur function showing the blur can be expressed as a Gaussian function where the width of the blur varies depending on the distance between the position of the object and the point of focus. Note that the blur function may be expressed as a pillbox function where the width of the blur varies depending on the distance between the position of the object and the point of focus.

Figure 8:
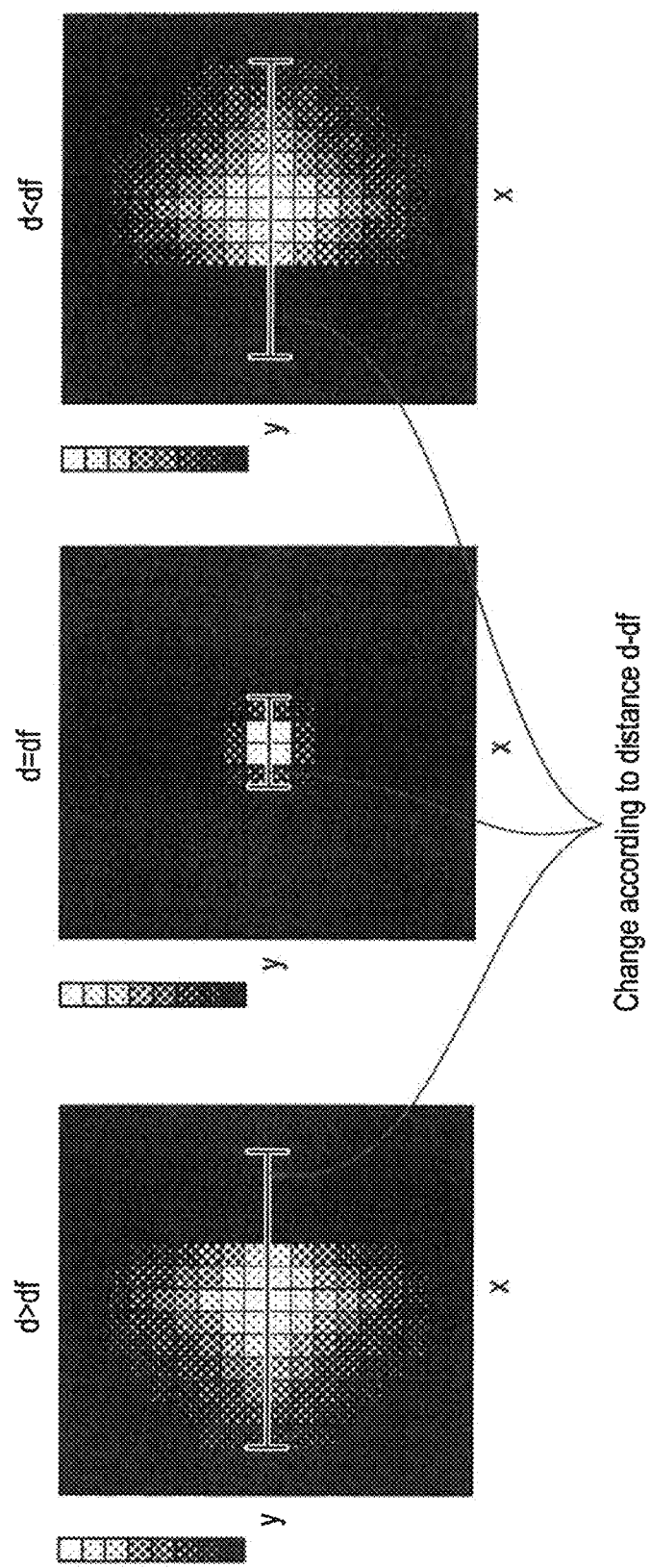
FIG. 8 illustrates an example of a blur function of a target image according to the embodiment.

FIG. 8 is a diagram showing an example of the blur function of the target image. Note that the center of each image is $(x_o, y_o)=(0, 0)$. As shown in FIG. 8, if the object is located on the far side of the point of focus, that is, if d>df, the blur function of the target image (for example, the R image) can be expressed as a Gaussian function where, when x>0, the width of the blur decreases due to attenuation of light in the first filter area 211. Further, if the object is located on the near side of the point of focus, that is, if d<df, the blur function of the target image can be expressed as a Gaussian function where, when x<0, the width of the blur decreases due to attenuation of light in the first filter area 211.

Further, the convolution kernels for correcting the blur shape of the target image to the blur shape of the reference image can be acquired by analyzing the blur function of the reference image and the blur function of the target image.

FIG. 9 is a diagram showing an example of the convolution kernel. Note that the convolution kernel shown in FIG. 9 is a convolution kernel in the case of using the filter 21 shown in FIG. 4. As shown in FIG. 9, the convolution kernel crosses the center point of the line segment at the boundary between the first filter area 211 and the second filter area 212 and is distributed over a straight line (in the vicinity of a straight line) which is orthogonal to this line segment. The distribution has such a mountain shape as shown in FIG. 9 that the peak (position on the line x and height) and the distribution from the peak vary depending on the assumed distance. The blur shape of the target image can be corrected to the various blurs shapes assuming arbitrary distances by using the convolution kernel. That is, a correction image assuming an arbitrary distance can be generated.

The distance estimator 42 acquires a distance at which the blur shape of the generated correction image is most closely approximated to or coincides with the blur shape of the reference image, from each pixel of the captured image. As the degree of coincidence of the blur shape, the correlation between the correction image and the reference image in an arbitrary-size rectangular area which is centered at each pixel may be calculated. In the calculation of the degree of coincidence of the blur shape, any existing similarity evaluation methods may be used. The distance estimator 42 estimates the distance to the object with respect to each pixel by acquiring a distance at which the correction image and the reference image have the highest correlation with each other.

For example, the existing similarity evaluation methods include the sum of squared differences (SSD), the sum of absolute differences (SAD), the normalized cross-correlation (NCC), the zero-mean normalized cross-correlation (ZNCC), the color alignment measure, etc.

In this way, the distance estimator 42 generates a correction image where a correction is made to the blur shape of the target image according to the filter area by the convolution kernel of the assumed distance, acquires a distance at which the correlation between the generated correction image and the reference image increases, and estimates the distance to the object.

Further, the distance estimator 42 generates the distance map (distance image) from the estimated distance. For example, the distance map is generated as an image where the pixel value of each pixel indicates a distance. For example, from the front side to the back side of the focal position, from a value indicating a long wavelength (red) to a value indicating a short wavelength (purple) are assigned, respectively. Accordingly, in the distance image, information indicating the distance to the object is mapped in accordance with the area of the image, and the pixel value is used as the information indicating the distance to the object. Since the distance image generated as an image can be displayed, for example, the positional relationship of a plurality of objects in the depth direction can be identified by colors. The distance estimator 42 generates output information including the generated distance image and outputs the same to the statistical strength calculator 43.

As described above, the image capture apparatus 1 can estimate the distances to the object and generate the distance image based on the blur in the captured image. However, according to the method by which to estimate the distances to the object based on the blur in the captured image, when an image of a distant object is captured, for example, the image becomes deteriorated due to an atmosphere failure such as fog or heat haze, which may lead to reduction in the accuracy of distance estimation. The influence of an atmosphere failure appears more remarkably as the light ray passes through the air at a longer distance. Thus, there is a possibility that, as the object is more distant from the position of the image capture apparatus, the image becomes more deteriorated and the accuracy of distance estimation is more lowered. Accordingly, there is a demand for implementation of a new technique by which, even if the image becomes deteriorated due to an atmosphere failure, the distance to the object can be acquired with high accuracy.

The image capture apparatus 1 (the image processing device 12) according to the present embodiment includes the statistical strength calculator 43 and the statistical processor 44. The statistical strength calculator 43 and the statistical processor 44 executes a statistical process on the distances to the object estimated by the distance estimator 42 with consideration given to the degree of the currently occurring atmosphere failure to calculate the distance to the object.

The statistical strength calculator 43 estimates the degree of influence of the atmosphere failure on the image and calculates the strength of the statistical process to be executed on the distances to the object estimated by the distance estimator 42 (hereinafter, called "statistical strength"). The statistical strength may also be called "correction strength" or "atmosphere failure removal strength". In the present embodiment, the statistical strength is to regulate the size of a filter to be used in the statistical process by the statistical processor 44. Otherwise, the statistical strength may indicate the file size itself.

An example of a procedure for statistical strength calculation process executed by the statistical strength calculator 43 will be described with reference to the flowchart of FIG. 10. However, described here is the statistical strength calculation process in a case where the target of the statistical process by the statistical processor 44 is the entire image. That is, the case where one statistical strength is calculated for one image will be described.

First, the statistical strength calculator 43 acquires the distance image including the information indicating the distances to the object estimated by the distance estimator 42 (step S1). Subsequently, the statistical strength calculator 43 calculates the sum of pixel values of a plurality of pixels constituting the acquired distance image (step S2). As described above, the distance image is an image in which the pixel value of each of the pixels indicates a distance, and thus the sum of pixel values of the pixels constituting the distance image is identical to the sum of the distances to the object.

Next, the statistical strength calculator 43 calculates the average of the pixel values of the plurality of pixels constituting the distance image based on the calculated sum of the pixel values and the number of the pixels in the acquired distance image. Specifically, the statistical strength calculator 43 calculates the average of the pixel values by dividing the calculated sum of the pixel values by the number of the pixels in the acquired distance image (step S3). As described above, the sum of pixel values of the pixels constituting the distance image is equal to the sum of the distances to the object, and thus the average of the pixel values is equal to the average of the distances to the object included (seen) in the distance image.

The statistical strength calculator 43 determines whether the calculated average of the pixel values is equal to or larger than a preset first threshold (step S4).

In general, the influence of an atmosphere failure tends to appear more remarkably as a light ray passes through the air at a longer distance. The first threshold value is set allowing for this tendency. Thus, the pixel value corresponding to the distance to the object at which the influence of an atmosphere failure starts to appear remarkably on the image, for example, 200 m, is set as first threshold. The first threshold may be arbitrarily changed by the user.

When the calculated average of the pixel values is equal to or larger than the preset first threshold (YES in step S4), the statistical strength calculator 43 determines that the object is located at a position far away from the image capture apparatus 1 and the captured image is likely to have been deteriorated under the influence of an atmosphere failure. After that, the statistical strength calculator 43 calculates a first strength (for example, it may also be expressed as "high" strength) as statistical strength (step S5), and moves to step S7 described later. The first strength is a strength corresponding to the size of a filter in which a large amount of information can be sampled in the statistical process by the statistical processor 44.

On the other hand, when the calculated average of the pixel values is smaller than the preset first threshold (NO in step S4), the statistical strength calculator 43 determines that the object is located at a position close to the image capture apparatus 1 and the captured image is under no influence of an atmosphere failure and is unlikely to have been deteriorated. After that, the statistical strength calculator 43 calculates a second strength (for example, it may also be expressed as "low" strength) (step S6), and moves to step S7 described later. The second strength is a strength corresponding to the size of a filter in which the number of samples in the statistical process by the statistical processor 44 is smaller than that at the first strength.

After that, the statistical strength calculator 43 generates output information including the calculated statistical strength and outputs the same to the statistical processor 44 (step S7), and terminates the statistical strength calculation process.

Figure 11:
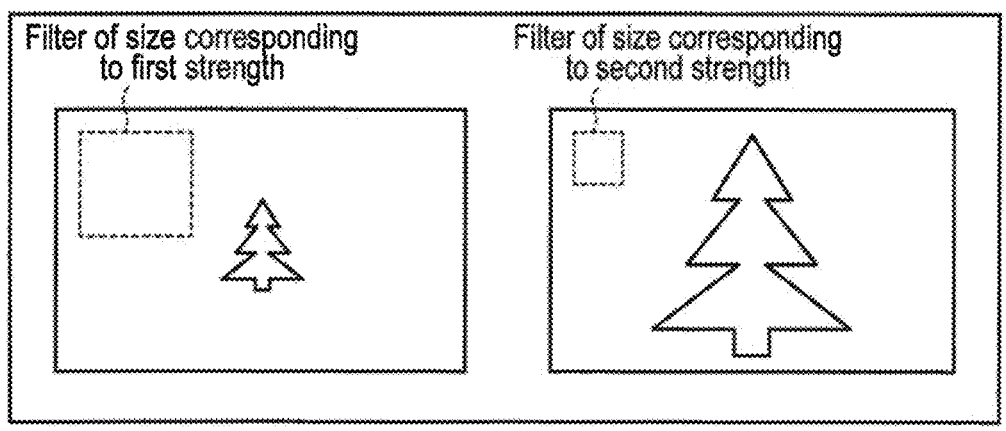
FIG. 11 is a diagram for describing the relationship between statistical strength and distance to an object according to the embodiment.

FIG. 11 is a schematic diagram illustrating the relationship between the distance between the statistical strength and the object. As described above, when the object is located at a position far away from the image capture apparatus 1, the captured image is likely to have been deteriorated under the influence of an atmosphere failure. Thus, as illustrated on the left side of FIG. 11, the filter of the size corresponding to the first strength is used in the statistical process described later. In addition, when the subject is located at a position close to the image capture apparatus 1, there is a low possibility that the captured image is deteriorated due to an atmosphere failure. Thus, as illustrated on the right side of FIG. 11, the filter of the size corresponding to the second strength smaller than the filter of the size corresponding to the first strength is used in the statistical process described later.

Although described later in detail, as the size of the filter used in the statistical process by the statistical processor 44 is larger, the number of samples increases to improve the accuracy of estimation of the distances to the object, but the contrast of the distance image is lowered. There is a circumstance that, under little influence of an atmosphere failure, it is preferred not to use a filter of so large a size (or not to execute a statistical process). In the present embodiment, however, the statistical strength calculator 43 estimates by the foregoing series of steps to what degree the captured image is influenced by an atmosphere failure and it is possible to select the size of the filter corresponding to the degree of the currently occurring atmosphere failure (or it is possible to select whether or not to execute the statistical process according to the degree of the currently occurring atmosphere failure). Accordingly, the distance estimation is enabled allowing for the foregoing circumstance.

The statistical processor 44 executes the statistical process using the filter of the size according to the statistical strength calculated by the statistical strength calculator 43, and calculates the distance from the image capture apparatus 1 to the object. The statistical process executed by the statistical processor 44 may be a statistical process using a mean filter, or may be a statistical process using a median filter, or may be a statistical process using a learning filter such as Deep Neural Network (DNN). That is, the statistical processor 44 can execute the statistical process using an arbitrary one of existing statistical filters.

Figure 13:
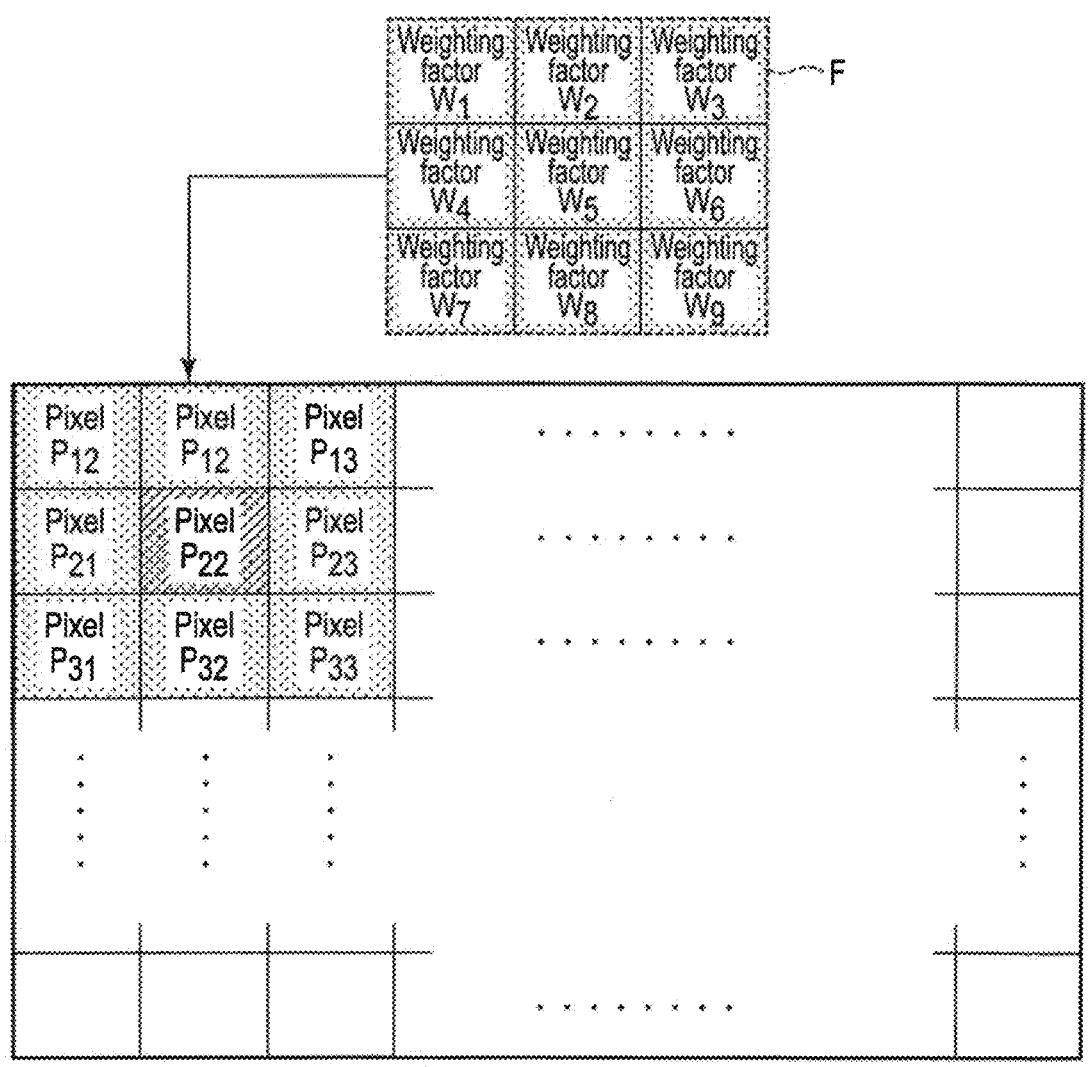
FIG. 13 is a diagram for complementally describing the statistical process by the statistical processor according to the embodiment.

An example of a procedure for the statistical process executed by the statistical processor 44 will be described with reference to the flowchart of FIG. 12 and the schematic diagram of FIG. 13. Here, the statistical process using a mean filter will be described as an example.

First, the statistical processor 44 acquires the distance image including information indicating the distances to the object estimated by the distance estimator 42 and the output information indicating the statistical strength calculated by the statistical strength calculator 43 (step S11). Subsequently, the statistical processor 44 selects the filter (in this case, the mean filter) of the size according to the statistical strength indicated by the acquired output information (step S12). The following description is based on the assumption that a 3×3-size mean filter F is selected, as illustrated in FIG. 13. In addition, it is assumed that weighting factors $W_1$ to $W_9$ set to the mean filter F are all 1.

The statistical processor 44 focuses on one of a plurality of pixels constituting the acquired distance image (step S13). Described below is the process focusing on a pixel $P_{22}$ illustrated in FIG. 13.

When the focused pixel $P_{22}$ is set on the center of the mean filter F, the statistical processor 44 acquires the pixel values of the pixels included in the mean filter F. More specifically, the statistical processor 44 acquires the pixel value of the focused pixel $P_{22}$ and the pixel values of eight pixels $P_{11}$ to $P_{13}$, $P_{21}$, $P_{23}$, and $P_{31}$ to $P_{33}$ around the pixel $P_{22}$ (step S14).

The statistical processor 44 calculates the sum of the acquired pixel values of the nine pixels $P_{11}$ to $P_{13}$, $P_{21}$ to $P_{23}$, and $P_{31}$ to $P_{33}$ (more specifically, the sum of the pixel values×the weighting factors) (step S15). After that, the statistical processor 44 divides the calculated sum of the pixel values by 9 to calculate the average of the pixel values (step S16).

The statistical processor 44 sets the calculated average of the pixel values as new pixel value of the focused pixel $P_{22}$. In other words, the statistical processor 44 replaces the pixel value of the focused pixel $P_{22}$ with the calculated average of the pixel values (step S17). As already described, in the distance image, the pixel values are used as information indicating the distances to the object, and thus the pixel value newly set to the focused pixel $P_{22}$ indicates the distance to the object calculated without the influence of an atmosphere failure.

After that, the statistical processor 44 determines whether all the pixels have been focused (step S18). When not determining that all the pixels have been focused (NO in step S18), the statistical processor 44 returns to step S13 to execute the same process with a focus on the pixel yet to be focused. On the other hand, when determining that all the pixels have been focused (YES in step S18), the statistical processor 44 terminates the statistical process.

Figure 14:
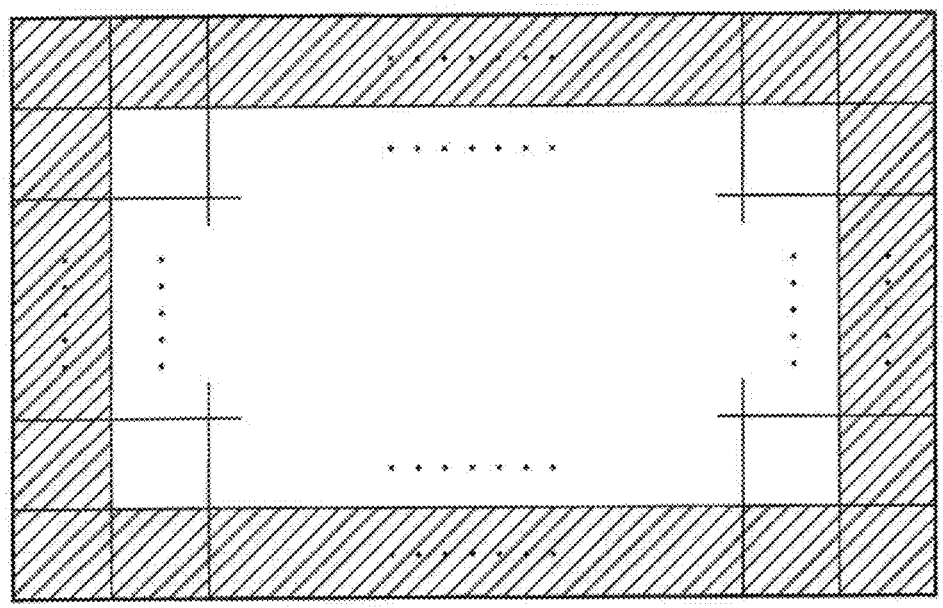
FIG. 14 is another diagram for complementally describing the statistical process by the statistical processor according to the embodiment.

A method for the process with a focus on pixels at ends of the image will be described complementarily. Each of the pixels at the ends of the image refers to the pixel that, when the pixel is focused and set on the center of the filter, does not allow all the pixels of the filter size to fall within the filter. Accordingly, the number of the pixels at the ends of the image varies depending on the size of the filter used. For example, when a 3×3-size filter is used, one each pixel on the periphery of the image (the shaded part in FIG. 14) constitutes the pixel at the ends of the image, and when a 5×5-size filter is used, two each pixels on the periphery of the image constitute the pixels at the ends of the image.

When focusing on the pixels at the ends of the image in step S13 described above, the statistical processor 44 executes step S14 described above using any of the methods below to acquire the lacking pixel values.

No pixels at the ends of the image are focused.

The lacking pixel values are acquired on the assumption that the lacking pixel values are all 0.

The lacking pixel values are acquired on the assumption that the lacking pixel values are identical to the pixel values of the pixels at the ends of the image (in other words, the lacking pixel values are padded with the pixel values of the pixels at the ends of the image).

On the presumption that a vertically (or horizontally) inverse image is attached to the image, the lacking pixel values are acquired from the inverse image.

Figure 15:
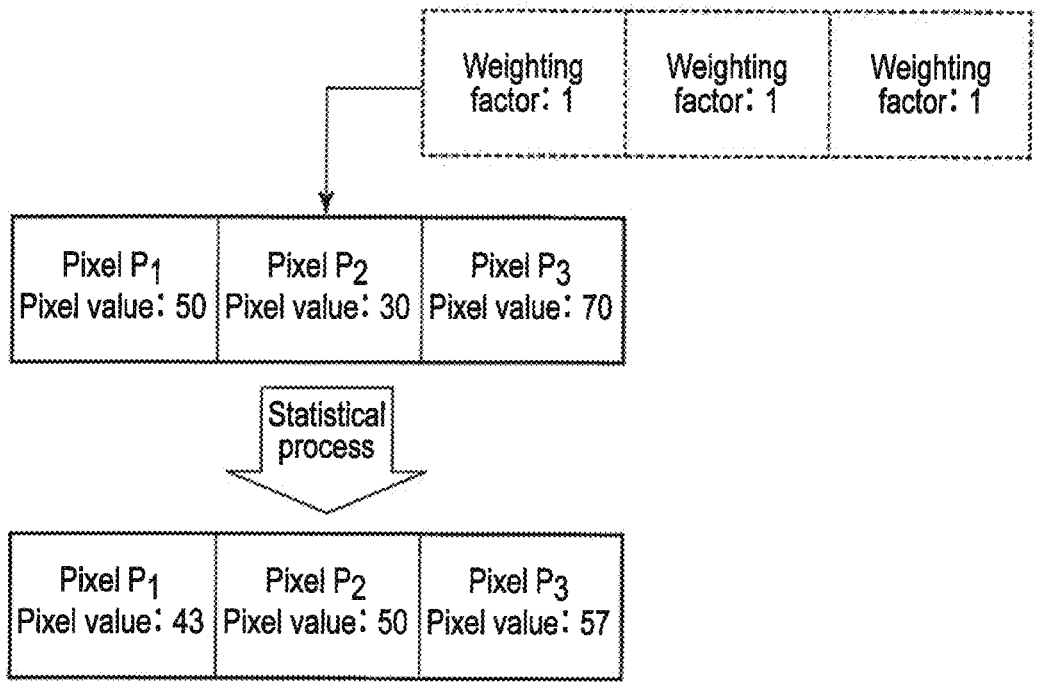
FIG. 15 is still another diagram for complementally describing the statistical process by the statistical processor according to the embodiment.

Further, an inconvenience (reduction in contrast) resulting from increase in file size will be described complementarily. For the sake of simplification, the following description is based on the assumption that the statistical process is executed using a 3×1-size mean filter (the weighing factors set to the mean filter are all 1) on an image formed by three laterally aligned pixels $P_1$ to $P_3$ as illustrated in FIG. 15. In addition, it is assumed that the pixel values of the pixels $P_1$ to $P_3$ under no influence of an atmosphere failure are 50, 60, and 70 in this order, which will be called true values. Meanwhile, it is assumed that the pixel $P_2$ is actually under the influence of an atmosphere failure and the pixel value of the pixel $P_2$ is degraded (changed) to 30. Further, when focusing on the pixels $P_1$ and $P_3$ at the ends of the image, the statistical processor 44 acquires the lacking pixel values by padding with the pixel values of the pixels at the ends of the image.

In this case, by the foregoing series of statistical steps, the pixel value of the pixel $P_1$ is 43 (={50+50+30}/3), the pixel value of the pixel $P_2$ is 50 (={50+30+70}/3), and the pixel value of the pixel $P_3$ is 57 (={30+70+70}/3). Accordingly, the pixel value of the pixel $P_2$ under the influence of an atmosphere failure changes from 30 to 50, which makes it possible to reduce an error from the true value of 60 from 30 to 10.

On the other hand, the pixel value of the pixel $P_1$ under no influence of an atmosphere failure changes from 50 to 43, which generates an error that has not been generated before the statistical process. Similarly, the pixel value of the pixel $P_3$ under no influence of an atmosphere failure changes from 70 to 57, which also generates an error that has not been generated before the statistical process. Further, the difference in pixel value between the pixel $P_1$ and the pixel $P_3$ is 14 after the statistical process, although was 20 before the statistical process. This increases the halftone pixels to lower the contrast of the image.

That is, the pixels under no influence of an atmosphere failure are influenced by more pixels (distant pixels) with increase in file size. Accordingly, there is a high possibility that larger errors will be generated by execution of the statistical process, which leads to reduction in the contrast of the image. Accordingly, in the present embodiment, the statistical strength calculator 43 calculates the statistical strength for selecting a filter of a size suitable for the degree of the currently occurring atmosphere failure.

The statistical processor 44 generates the distance image including the distance information having undergone the statistical process by the foregoing series of steps, and outputs the generated distance image to a user terminal or the like via the communication unit 35. Otherwise, when the image capture apparatus 1 is provided with a display, the statistical processor 44 outputs the distance image to the display so that the distance image is displayed on the display. Accordingly, the user operating the user terminal or the user operating the image capture apparatus 1 can visually check the distance to the object that is calculated allowing for the influence of the atmosphere failure.

FIG. 12 describes the statistical process using a mean filter. However, the statistical process is not limited to this but the statistical processor 44 can execute the statistical process in the same manner using an arbitrary one of existing statistical filters. For example, from the viewpoint of maintaining the contrast of the image, the statistical processor 44 may execute the statistical process using a bilateral filter or the like, or may execute the statistical process using a learning filter to focus on only the pixels under the influence of an atmosphere failure but not to focus on the pixels under no influence of an atmosphere failure.

In the present embodiment, the statistical strength calculator 43 calculates either the first strength or the second strength as the statistical strength, but the statistical strength is not limited to this. The statistical strength calculator 43 may calculate a more subdivided statistical strength. For example, when the statistical processor 44 can use filters of m kinds (m is a positive integer) of sizes, the statistical strength calculator 43 calculates any of the statistical strengths subdivided into m levels to cause the statistical processor 44 to select any of the m kinds of filter sizes.

In the present embodiment, one statistical strength is calculated for one image as an example. However, the statistical strength is not limited to this. For example, one statistical strength may be calculated for pixels constituting an image. In this case, the statistical processor 44 can execute the statistical process with changes in the size of the filter for each of the focused pixels, thereby to further improve the accuracy of estimation of the distances to the object.

Otherwise, one statistical strength may be calculated for a predetermined region (region of interest (ROI)) of an image. In this case, the statistical strength calculator 43 needs to execute the series of steps described in FIG. 10 only in the predetermined region, and the statistical processor 44 also needs to execute the statistical process only in the predetermined region. This makes it possible to decrease the targets to be processed, thereby shortening the time necessary for the series of steps described in FIGS. 10 and 12. The predetermined region may be set by the user's operation with the input/output unit 34 (or the communication unit 35), or a region where it is estimated that the mobile body exists may be detected, for example, so that the detected region is set to the predetermined region. The mobile body may be detected by comparing a plurality of images continuous in a time-series manner and detecting a region with changes in the images, for example.

Figure 10:
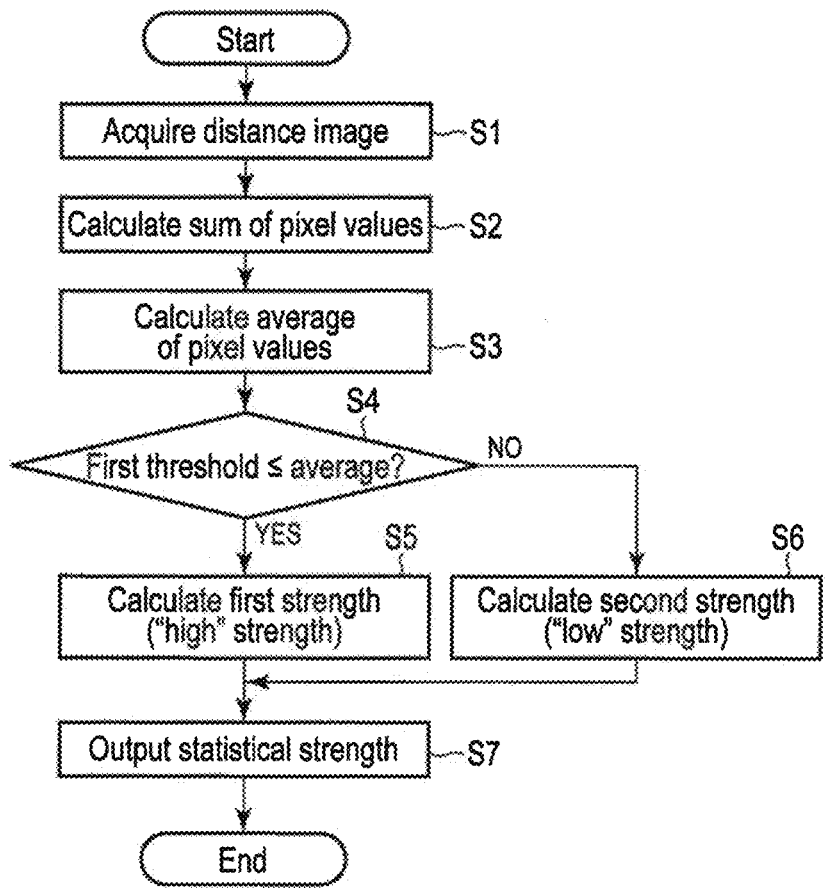
FIG. 10 is a flowchart of an example of a procedure for a statistical strength calculation process by a statistical strength calculator according to the embodiment.
Figure 16:
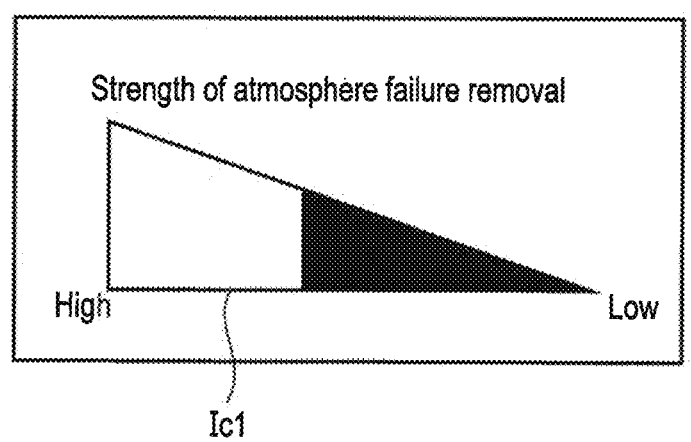
FIG. 16 illustrates an icon suggested to a user of the image capture apparatus according to the embodiment.

In the present embodiment, the statistical strength is calculated by the statistical strength calculator 43 executing the series of steps described in FIG. 10. However, the statistical strength is not limited to this but may be determined by the user's operation. Specifically, the statistical strength may be determined by the input/output unit 34 outputting an icon Ic1 by which the statistical strength is adjustable as illustrated in FIG. 16 to the display unit not illustrated, and inputting an instruction from the user on the icon Ic1. For example, when the display unit not illustrated is a touch screen display, the statistical strength may be determined such that the user instruction is input by a touch operation of moving the gauge of the icon Ic1 illustrated in FIG. 16 to the right or left.

Alternatively, the statistical strength may be determined based on the result of the series of steps described in FIG. 10 by the statistical strength calculator 43 and the input of an instruction by the user. For example, as the result of the series of steps described in FIG. 10, when the statistical strength calculator 43 calculates the first strength and the instruction from the user on the icon Ic1 illustrated in FIG. 16 specifies a "high" statistical strength, the statistical strength calculator 43 may calculate (determine) a higher value of the first strength as final statistical strength. Similarly, as the result of the series of steps described in FIG. 10, for example, when the statistical strength calculator 43 calculates the first strength and the instruction from the user on the icon Ic1 illustrated in FIG. 16 specifies a "low" statistical strength, the statistical strength calculator 43 may calculate a lower value of the first strength as final statistical strength.

Further, in the present embodiment, the statistical strength is calculated by the statistical strength calculator 43 executing the series of steps described in FIG. 10. However, the statistical strength is not limited to this but may be determined based on weather information. Specifically, the statistical strength calculator 43 may acquire weather information from an external device via the communication unit 35 and determine the statistical strength based on the acquired weather information. For example, when the acquired weather information indicates fine weather, an air temperature higher (than a predetermined value), and a wind speed lower (than a predetermined value), the statistical strength calculator 43 may determine that there is a high possibility that heat haze has occurred as one of atmosphere failures and calculate the first strength as statistical strength. That is, when a weather condition indicated by the acquired weather information satisfies the condition for occurrence of an atmosphere failure, the statistical strength calculator 43 may calculate the first strength as statistical strength, or when the weather condition does not satisfy the condition for occurrence of an atmosphere failure, the statistical strength calculator 43 may calculate the second strength as statistical strength.

As with the method for determining the statistical strength based on the user's operation, the method for determining the statistical strength based on weather information may be used in combination with another method for determining the statistical strength (for example, the series of steps described in FIG. 10).

Further, in the present embodiment, the statistical strength is calculated by the statistical strength calculator 43 executing the series of steps described in FIG. 10. However, the statistical strength is not limited to this but may be determined based on the temperature (air temperature) measured by a thermometer (or a temperature measuring function) not illustrated but provided in the image capture apparatus 1. Specifically, the statistical strength calculator 43 may acquire measurement information indicating the current air temperature measured by the thermometer and determine the statistical strength based on the acquired measurement information. For example, when the air temperature indicated by the acquired measurement information is higher than a predetermined value, the statistical strength calculator 43 may determine that heat haze as one of atmosphere failures is likely to have occurred and calculate the first strength as statistical strength. Specifically, when a condition indicated by the acquired measurement information satisfies the condition for occurrence of an atmosphere failure, the statistical strength calculator 43 may calculate the first strength as statistical strength, or when the condition does not satisfy the condition for occurrence of an atmosphere failure, the statistical strength calculator 43 may calculate the second strength as statistical strength. This case is based on the assumption that the image capture apparatus 1 is provided with the thermometer. However, the image capture apparatus 1 is not limited to this but may be further provided with a hydrometer, for example, so that the statistical strength is calculated based on the measurement information acquired from the thermometer and the hydrometer. Alternatively, the image capture apparatus 1 may be further provided with an altimeter so that the statistical strength is calculated based on the measurement information acquired from the thermometer and the altimeter.

As with the method for determining the statistical strength based on the user's operation and the method for determining the statistical strength based on the weather information, the method for determining the statistical strength based on the measurement information may be used in combination with another method for determining the statistical strength.

In the present embodiment, the statistical strength is calculated by the statistical strength calculator 43 executing the series of steps described in FIG. 10. However, the statistical strength is not limited to this but may be determined based on the result of a comparison between a previously prepared image not influenced by an atmosphere failure and not including (not reflecting) a mobile body (hereinafter, called "background image") and a currently captured image. The background image can be obtained by executing a statistical process on a plurality of images continuous in a time-series manner, for example.

As the result of the foregoing comparison, the statistical strength calculator 43 can calculate the difference between the background image and the currently captured image as illustrated in FIG. 17, for example. Since the difference constitutes the portion under the influence of the atmosphere failure, the statistical strength calculator 43 can calculate the degree of the atmosphere failure (also called the strength of the atmosphere failure) based on the number of the pixels constituting the currently captured image and the number of the pixels corresponding to the difference portion. For example, when the number of pixels constituting the currently captured image is N and the number of the pixels corresponding to the difference portion is a, the degree of the atmosphere failure is calculated as a/N %. Accordingly, the statistical strength calculator 43 can calculate the statistical strength by Equation (1) below. In Equation (1), "I" represents statistical strength and "C" represents a predetermined coefficient.

$$I = C \times (a/N) \quad (1)$$

In this manner, the statistical strength "I" inherent to the currently captured image can be calculated, which allows the statistical processor 44 to generate a filter of an arbitrary size using the calculated statistical strength "I".

To calculate the foregoing difference, the statistical strength calculator 43 determines whether any mobile body is seen in the currently captured image. When determining that the mobile body is seen, the statistical strength calculator 43 removes a mobile body region where the mobile body is seen from the captured image and compares the captured image to the background image. It can be determined whether the mobile body is seen by the same method as for the detection of a mobile body described above.

The degree of the atmosphere failure calculated by the statistical strength calculator 43 may be output to the display unit not illustrated via the input/output unit 34. In this case, when the calculated degree of the atmosphere failure is equal to or higher than a preset threshold th, the statistical strength calculator 43 may display on the display unit not illustrated a message for prompting the user to stop measurement of the distance to the object together with an icon Ic2 indicating the degree of the atmosphere failure as illustrated in FIG. 18, for example.

In the present embodiment, the statistical processor 44 selects the filter of the size corresponding to the statistical strength calculated by the statistical strength calculator 43 and executes the statistical process. However, the statistical processor 44 is not limited to this operation but may estimate the type of the currently occurring atmosphere failure based on weather information acquired by an external device via the communication unit 35, select a filter of a type suitable for the estimated type of the atmosphere failure, and then select a filter of the size corresponding to the statistical strength calculated by the statistical strength calculator 43 and execute the statistical process, for example. According to this, the statistical process can be executed allowing for not only the degree of the currently occurring atmosphere failure but also the type of the atmosphere failure, thereby to further improve the accuracy of estimation of the distances to the object.

In the present embodiment, the distance estimator 42 estimates the distances to the object by generating the corrected image in which the blur shape of the target image corresponding to the filter region is corrected by a convolution kernel with the assumption of the distance, and determining the distances at which the correlation between the generated correction image and the reference image is higher. However, the method for estimating the distance to the object is not limited to this. For example, the distance estimator 42 may estimate the distances to the object by performing an edge extraction process on the R image, the G image, and the B image and calculating the amounts of color deviation in the images based on the distances among the extracted edges of the images. In this method as well, the G image is used as reference image.

The distance estimator 42 may estimate the distances to the object by using an image generated based on a light ray passing through a coding aperture in the camera with a mask, a diffuser, a phase plate, an lens array, and others. Alternatively, the distance estimator 42 may estimate the distances to the object using deep learning such as DNN or may estimate the distances to the object using motion blur. To estimate the distances to the object using deep learning, the distance to the object according to the captured conditions and the target as object is preliminarily learned, for example, to determine what the object seen in the captured image is. As a result, the distances to the object can be estimated.

According to the embodiment described above, the image capture apparatus 1 includes the statistical strength calculator 43 that calculates the statistical strength according to the currently occurring atmosphere failure and the statistical processor 44 that selects the filter of the size according to the statistical strength calculated by the statistical strength calculator 43 and executes the statistical process on the distances to the object roughly estimated by the distance estimator 42. This makes it possible to acquire the distance to the object from the image with high accuracy.

Specifically, when distance measurement is made based on an arbitrary pixel selected from an image in which an object of a certain size is seen as object, there is a possibility that the calculated distance is significantly different from the actual distance due to the influence of atmosphere failure. In the image capture apparatus 1 according to this embodiment, however, it is possible to suppress diffusion of errors in pixels (pixel values) caused by the atmosphere failure. Accordingly, even when an arbitrary pixel is selected as described above, there is a high possibility that the distance can be correctly measured.

Application Examples

Several application examples of the image capture apparatus 1 configured as described above will be described below.

Figure 19:
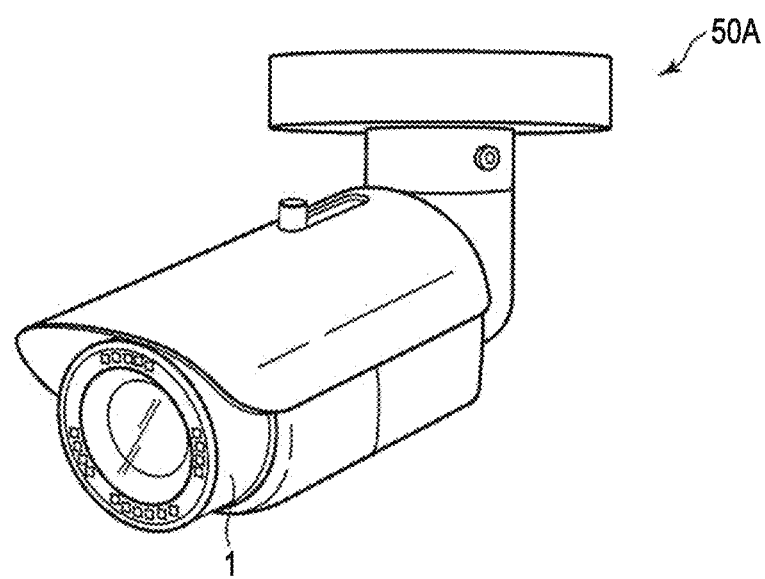
FIG. 19 is a diagram for describing a case in which the image capture apparatus according to the embodiment is applied to a monitoring camera.

FIG. 19 illustrates an example in which the image capture apparatus 1 is applied to a monitoring camera. A monitoring camera 50A illustrated in FIG. 19 is assumed as a monitoring camera for monitoring in a long distance at a fixed point. As described above, the influence of an atmosphere failure appears more remarkably as the light ray passes through the air at a longer distance. Accordingly, in the monitoring camera 50A for monitoring in a long distance, the deterioration of images due to an atmosphere failure becomes a large problem. However, the application of the image capture apparatus 1 according to the present embodiment allows the removal of the influence of an atmosphere failure, which makes it possible to calculate the distance to a monitoring target in a long distance with high accuracy. According to a general method for removing an atmosphere failure, when a mobile body is seen in a capture image, the atmosphere failure is removed only from the region other than a mobile body region with the mobile body. However, the image capture apparatus 1 according to the present embodiment allows the removal of the atmosphere failure from the mobile body region as well, which is useful in particular in the case where the monitoring target is a mobile body.

Figure 20:
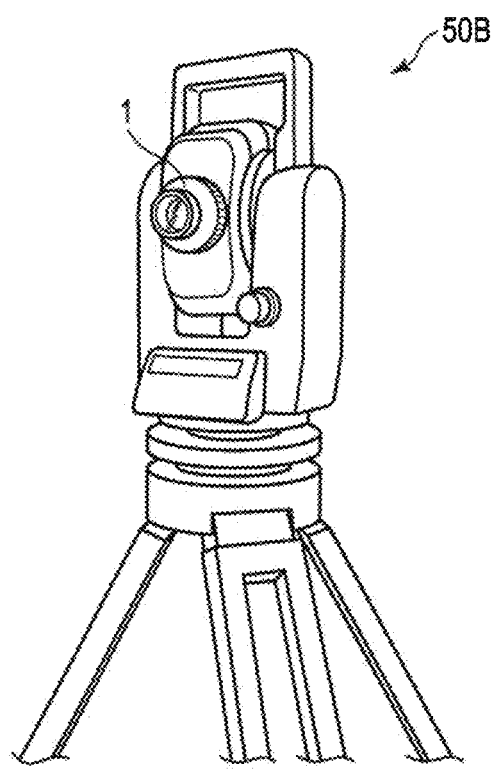
FIG. 20 is a diagram for describing a case in which the image capture apparatus according to the embodiment is applied to a distance meter.

FIG. 20 illustrates an example in which the image capture apparatus 1 is applied to a distance meter (range finder). The distance meter is used to measure the distance from the position of the distance meter (capturing point) to the target point and is installed on a road, for example. Accordingly, the distance meter has a problem of being likely to receive the influence of heat haze due to heat radiated from asphalt. However, according to a distance meter 50B to which the image capture apparatus 1 according to the present embodiment is applied, even when heat haze is generated by heat radiated from asphalt, it is possible to measure the distance to the target point while removing the influence of the heat haze. That is, it is possible to improve the accuracy of measurement of the distance to the target point.

FIGS. 19 and 20 describe the application of the image capture apparatus 1 to an object 50 standing still at the time of capturing. Hereinafter, descriptions will be given as to the case of applying the image capture apparatus 1 to a mobile body.

FIG. 21 illustrates an exemplary functional structure of a movable body 60 including the image capture apparatus 1. The movable body 60 can be realized, for example, as a car having a self-driving function, an unmanned aerial vehicle, and an autonomous mobile robot. Examples of the unmanned aerial vehicle include an airplane, a rotary wing aircraft, a glider, or an airship that a person cannot board.

The unmanned aerial vehicle can fly by remote control or on autopilot, and examples thereof include a drone (multicopter), a radio control plane, and a helicopter for spraying agricultural chemicals. An example of the autonomous mobile robot includes a mobile robot such as an automated guided vehicle (AGV), a cleaning robot used for floor cleaning, and a communication robot that provides various kinds of information to visitors. In addition to the examples in which the robot itself moves, the movable body 60 may also be an industrial robot having a drive system for moving and rotating a part of the robot such as a robot arm.

As illustrated in FIG. 21, the movable body 60 includes, for example, the image capture apparatus 1, a control signal generator 13, and a drive system 14. The image capture apparatus 1 is installed, for example, so as to capture an object in a traveling direction of the movable body 60 or a part thereof.

In a case where the movable body 60 is a car 60A as illustrated in FIG. 22, the image capture apparatus 1 may be installed as what is called a front camera that captures an image in front of the movable body 60, or as what is called a rear camera that captures an image in back of the movable body 60 when backing. It is a matter of course that both of those cameras may be installed. The image capture apparatus 1 may double as what is called a drive recorder. In other words, the image capture apparatus 1 may be a video recorder including the image processing device 12.

Figure 23:
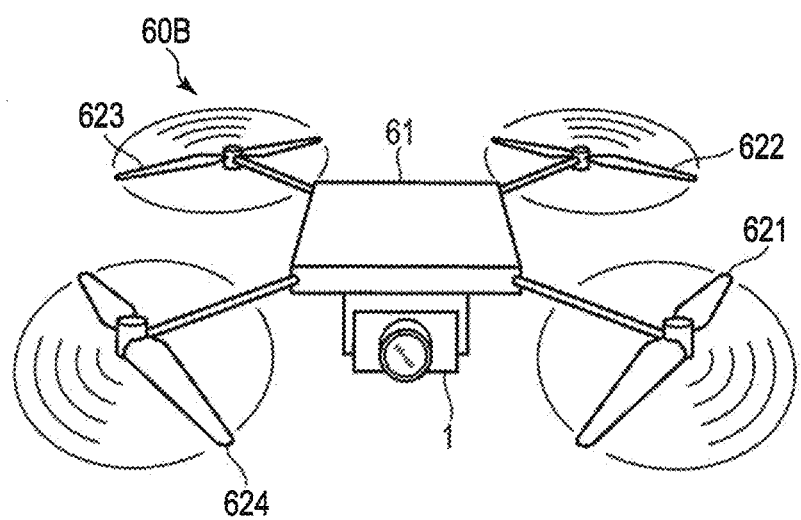
FIG. 23 is a diagram for describing a case in which the image capture apparatus according to the embodiment is applied to a drone as a mobile body.

FIG. 23 illustrates another example in a case where the movable body 60 is a drone 60B. The drone 60B includes a drone body 61 corresponding to the drive system 14 and four propeller units 621, 622, 623, and 624. Each of the propeller units 621, 622, 623, and 624 includes a propeller and a motor. Transmitting drive of the motor to the propeller rotates the propeller, and the drone 60B floats due to lifting force caused by the rotation. The image capture apparatus 1 is mounted on, for example, a lower part of the drone body 61.

Figure 24:
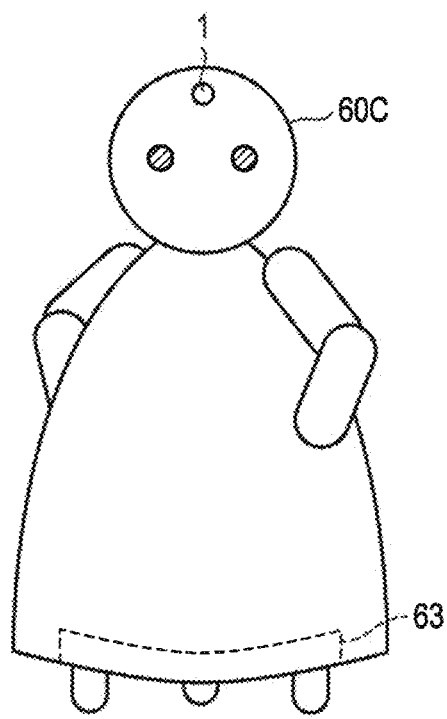
FIG. 24 is a diagram for describing a case in which the image capture apparatus according to the embodiment is applied to a robot as a mobile body.

FIG. 24 illustrates another example in a case where the movable body 60 is an autonomous mobile robot 60C. A power output unit 63 including a motor, wheels, and the like, corresponding to the drive system 14 is provided to a lower part of the mobile robot 60C. The power output unit 63 controls rotation frequency of the motor and postures of the wheels. Transmitting drive of the motor to the wheels rotates the wheels in contact with a road surface or a floor surface. As the postures of the wheels are controlled, the mobile robot 60C can move in any direction. The image capture apparatus 1 may be installed, for example, on the head of the humanoid mobile robot 60C so as to capture an image in front of the mobile robot 60C. It should be noted that the image capture apparatus 1 may be installed so as to capture an image in back of, or right/left side of the mobile robot 60C. Alternatively, the image capture apparatus 1 may be installed in plural so as to capture images in multiple directions.

Figure 25:
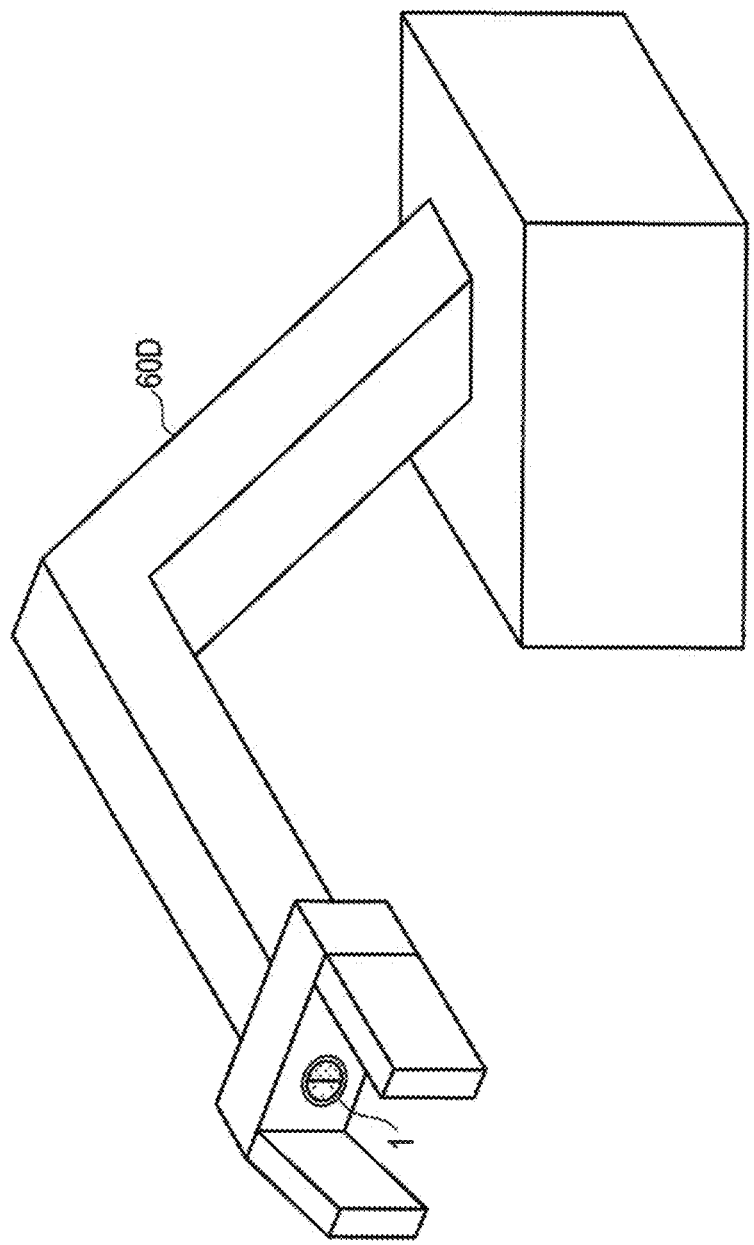
FIG. 25 is a diagram for describing a case in which the image capture apparatus according to the embodiment is applied to a robot arm as a mobile body.

In a case of controlling movement and rotation of a part of the movable body 60, the image capture apparatus 1 may be installed at a leading end and the like of a robot arm 60D, as illustrated in FIG. 25, so as to capture an object held by the robot arm 60D. The image processing device 12 estimates a distance to an object which is to be held. Accordingly, the robot arm 60D can perform an accurate operation to hold the object.

The control signal generator 13 outputs a control signal to control the drive system 14 based on the distance to the object output from the image capture apparatus 1. The drive system 14 drives the movable body 60 or a part of the movable body 60 by the control signal. The drive system 14 performs, for example, at least one of the following operations: operations to move, rotate, accelerate, or decelerate the movable body 60 or a part thereof, an operation to increase or decrease thrust (lifting force) of the movable body 60 or a part thereof, an operation to change a traveling direction, an operation to switch between a normal operation mode and an automatic operation mode (collision avoidance mode), or an operation to activate a safety device such as an air bag. In a case where a distance to the object is less than a threshold, the drive system 14 may perform, for example, at least one of the following operations: operations to move, rotate, accelerate, increase or decrease thrust (lifting force), an operation to change directions so as to face a direction in which the movable body 60 approaches an object, or an operation to switch from the automatic operation mode (collision avoidance mode) to the normal operation mode.

The drive system 14 of the car 60A is, for example, a tire. The drive system 14 of the drone 60B is, for example, a propeller. The drive system 14 of the mobile robot 60C is, for example, leg units. The drive system 14 of the robot arm 60D is, for example, a support unit that supports the leading end provided with the image capture apparatus 1.

The movable body 60 may further include a speaker or a display in which information relating to the distance to the object from the image processing device 12 is input. The speaker and the display output sounds or images relating to the distance to the object. The speaker and the display are connected to the image capture apparatus 1 through wire or wirelessly. The movable body 60 may also include a light emitting unit in which the information relating to the distance to the object from the image processing device 12 is input. The light emitting unit is configured to, for example, turn on or off a light in accordance with the information relating to the distance to the object from the image processing device 12.

In a case where the movable body 60 is a drone, when generating a map (a three-dimensional shape of an object), investigating a structure of a building or terrain, or checking cracks or breakage in an electric wire from the sky, the image capture apparatus 1 obtains an image of an object and determines whether a distance to the object is equal to or more than a threshold. Based on the determination result, the control signal generator 13 generates a control signal for controlling thrust of the drone so that the distance to the object to be inspected is kept constant. Herein, the thrust also includes lifting force. As the drive system 14 operates the drone based on this control signal, the drone can fly in parallel to the object to be inspected. In a case where the movable body 60 is a monitoring drone, a control signal for controlling thrust of the drone may be generated so that a distance to an object to be monitored is kept constant.

When the drones fly, the image capture apparatus 1 obtains an image shot in a direction toward the ground and determines whether a distance to the ground is equal to or more than a threshold. Based on the determination result, the control signal generator 13 generates a control signal for controlling the thrust of the drone so that a height from the ground is set to a specified height. As the drive system 14 operates the drone based on this control signal, the drone can fly at the specified height. In a case where the movable body 60 is a drone for spraying agricultural chemicals, an agricultural chemical can be spread evenly as a height of the drone from the ground is kept constant.

In a case where the movable body 60 is a drone or a car, when drones fly in concert with each other or when cars drive in a row, the image capture apparatus 1 obtains images shot of surrounding drones or an image of a car in front of the movable body 60, and determines whether distances to the surrounding drones or a distance to the foregoing car is equal to or more than a threshold. Based on the determination result, the control signal generator 13 generates a control signal for controlling thrust of the drone or a speed of the car so that the distances to the surrounding drones or the distance to the foregoing car is kept constant. As the drive system 14 operates the drone or the car based on this control signal, the drone can easily fly in concert with other drones or the car can easily drive in a row with other cars. In a case where the movable body 60 is a car, a threshold may be changed as the movable body 60 receives an instruction from a driver through a user interface so that the driver can set the threshold. Accordingly, the driver can drive the car while keeping his/her preferred inter-vehicular distance. Alternatively, in order to maintain a safe inter-vehicular distance to a foregoing car, a threshold may be changed in accordance with the speed of the car. The safe inter-vehicular distance varies depending on the speed of the car. The more the speed of the car increases, the longer the threshold is set. In the case where the movable body 60 is a car, a predetermined distance in a traveling direction is preferably set as a threshold, and the control signal generator 13 is preferably configured to automatically operate a brake or a safety device such as an air bag when an object appears in front of the threshold. In this case, the safety device such as an automatic brake or an air bag is provided to the drive system 14.

As described above, according to an embodiment, it is possible to acquire the distance to the object from an image with high accuracy, and it is easy to control the operations of a monitoring camera, distance meter, automobile, drone, robot, or the like, for example, by using the acquired distance to the object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
a hardware processor implemented by one or more processors; wherein
the hardware processor is configured to:
acquire an image captured by a monocular camera;
estimate a distance to an object based on the acquired image;
calculate the distance to the object by considering an atmosphere failure influencing the acquired image and executing a statistical process on the estimated distance;
estimate a degree of the atmosphere failure based on the estimated distance,
calculate a strength of the statistical process based on the estimated degree of the atmosphere failure, and
calculate the distance to the object by executing the statistical process on the estimated distance based on the calculated strength of the statistical process.

2. The image processing device of claim 1, wherein the hardware processor is configured to calculate the distance to the object by executing the statistical process on the estimated distance based on the strength of the statistical process specified by a user's operation.

3. The image processing device of claim 1, wherein the hardware processor is configured to:
calculate the strength of the statistical process based on weather information acquired from an external device, and
calculate the distance to the object by executing the statistical process on the estimated distance based on the calculated strength of the statistical process.

4. The image processing device of claim 1, wherein the hardware processor is configured to:
measure an air temperature,
calculate the strength of the statistical process based on the measured air temperature, and
calculate the distance to the object by executing the statistical process on the estimated distance based on the calculated strength of the statistical process.

5. The image processing device of claim 1, wherein the hardware processor is configured to:
estimate the degree of the atmosphere failure based on a result of comparison of a prepared image under no influence of the atmosphere failure with the acquired image,
calculate the strength of the statistical process based on the estimated degree of the atmosphere failure, and
calculate the distance to the object by executing the statistical process on the estimated distance based on the calculated strength of the statistical process.

6. The image processing device of claim 5, wherein the hardware processor is configured to, when the estimated degree of the atmosphere failure is equal to or larger than a threshold, notify a user to stop measurement of the distance to the object.

7. The image processing device of claim 1, wherein the hardware processor is configured to estimate the distance to the object by using a first image with a first color component and a second image with a second color component that is different from the first color component and has a blur function expressed in point asymmetry.

8. The image processing device of claim 1, wherein the hardware processor is configured to:
acquire a first image that has a blur function indicating a non-slanted blur shape and a second image that has the blur function indicating a slanted blur shape,
generate a plurality of third images by adding a plurality of different blurs to the acquired second image, and
estimate the distance to the object according to a correlation between the acquired first image and the generated plurality of third images.

9. The image processing device of claim 1, wherein the hardware processor is configured to:
acquire a first image that has a blur function indicating a non-slanted blur shape and a second image that has the blur function indicating a slanted blur shape,
extract edges from the acquired first image and second image,
calculate amounts of color deviation in the images based on the distances between the extracted edges of the images, and
estimate the distance to the object based on the calculated amounts of color deviation.

10. An imaging capture apparatus comprising:
an image processing device comprising a hardware processor implemented by one or more processors; and
a monocular camera, wherein
the hardware processor is configured to:
acquire an image captured by the monocular camera;
estimate a distance to an object based on the acquired image;
calculate the distance to the object by considering an atmosphere failure influencing the acquired image and executing a statistical process on the estimated distance;
estimate a degree of the atmosphere failure based on the estimated distance,
calculate a strength of the statistical process based on the estimated degree of the atmosphere failure, and
calculate the distance to the object by executing the statistical process on the estimated distance based on the calculated strength of the statistical process.

* * * * *